United States Patent
Ohtake

Patent Number: 5,828,499
Date of Patent: Oct. 27, 1998

[54] ZOOM LENS SYSTEM

[75] Inventor: Motoyuki Ohtake, Kanagawa, Japan

[73] Assignee: Nikon Corporation, Tokyo, Japan

[21] Appl. No.: 960,097

[22] Filed: Oct. 27, 1997

Related U.S. Application Data

[63] Continuation of Ser. No. 605,543, Feb. 16, 1996, abandoned.

[30] Foreign Application Priority Data

Feb. 23, 1995 [JP] Japan .................................. 7-059946

[51] Int. Cl.$^6$ ............................. G02B 15/14; G02B 27/64
[52] U.S. Cl. ......................... 359/676; 359/554; 359/557; 359/687; 359/690
[58] Field of Search ..................................... 359/681, 682, 359/683, 684, 687, 690, 695, 676, 554, 557; 396/55

[56] References Cited

U.S. PATENT DOCUMENTS

| | | | |
|---|---|---|---|
| 4,749,265 | 6/1988 | Hattori et al. | 359/687 |
| 4,844,602 | 7/1989 | Kitagishi et al. | 359/557 |
| 4,907,868 | 3/1990 | Kitagishi et al. | 359/557 |
| 4,929,069 | 5/1990 | Shibayama | 359/692 |
| 4,974,950 | 12/1990 | Yamazaki et al. | 359/557 |
| 4,986,643 | 1/1991 | Moriyama | 359/693 |
| 5,032,013 | 7/1991 | Shibayama | 359/687 |
| 5,039,211 | 8/1991 | Maruyama | 359/557 |
| 5,182,673 | 1/1993 | Kikuchi et al. | 359/691 |
| 5,241,420 | 8/1993 | Yamanashi | 359/684 |
| 5,270,857 | 12/1993 | Oizumi et al. | 359/554 |
| 5,337,098 | 8/1994 | Imafuji et al. | 396/55 |
| 5,402,197 | 3/1995 | Okano et al. | 396/55 |
| 5,416,558 | 5/1995 | Katayama et al. | 396/52 |
| 5,477,297 | 12/1995 | Suzuki | 396/55 |
| 5,493,447 | 2/1996 | Ohtake | 359/686 |
| 5,568,321 | 10/1996 | Ogawa et al. | 359/687 |
| 5,579,171 | 11/1996 | Suzuki et al. | 359/687 |

FOREIGN PATENT DOCUMENTS

| | | |
|---|---|---|
| 655 638 | 4/1995 | European Pat. Off. . |
| 57-169716 | 10/1982 | Japan . |
| 60-188918 | 9/1985 | Japan . |
| 62-75412 | 4/1987 | Japan . |
| 63-157120 | 6/1988 | Japan . |
| 3-141313 | 5/1991 | Japan . |
| 5-244160 | 9/1993 | Japan . |
| 6-130291 | 5/1994 | Japan . |
| 6-265788 | 9/1994 | Japan . |

*Primary Examiner*—Georgia Y. Epps
*Assistant Examiner*—Jordan M. Schwartz
*Attorney, Agent, or Firm*—Oliff & Berridge, PLC

[57] ABSTRACT

A high variable power zoom lens system that performs image formation and also covers a wide-angle area. The zoom lens includes a first lens group having a positive refractive power arranged at the object side, a second lens group having a negative refractive power adjacent to the image side of the first lens group and a third lens group having a positive refractive power adjacent to the image side of the second lens group. The second lens group includes, in order from the object side, a double concave lens component, a positive lens having a convex surface facing the object side and a negative lens with the concave surface facing the object side. The zoom lens system preferably satisfies the following Conditions:

$$0.8 < ra/rb < 3$$

$$0.4 < (\beta 2w \cdot \beta 2t)^{1/2} < 0.7$$

where ra and rb are the radii of curvature of the double concave lens and the negative lens, respectively. Further, $\beta 2w$ and $\beta 2t$ are the second lens group lateral magnification in the maximum wide-angle state and the maximum telephoto state, respectively.

19 Claims, 23 Drawing Sheets

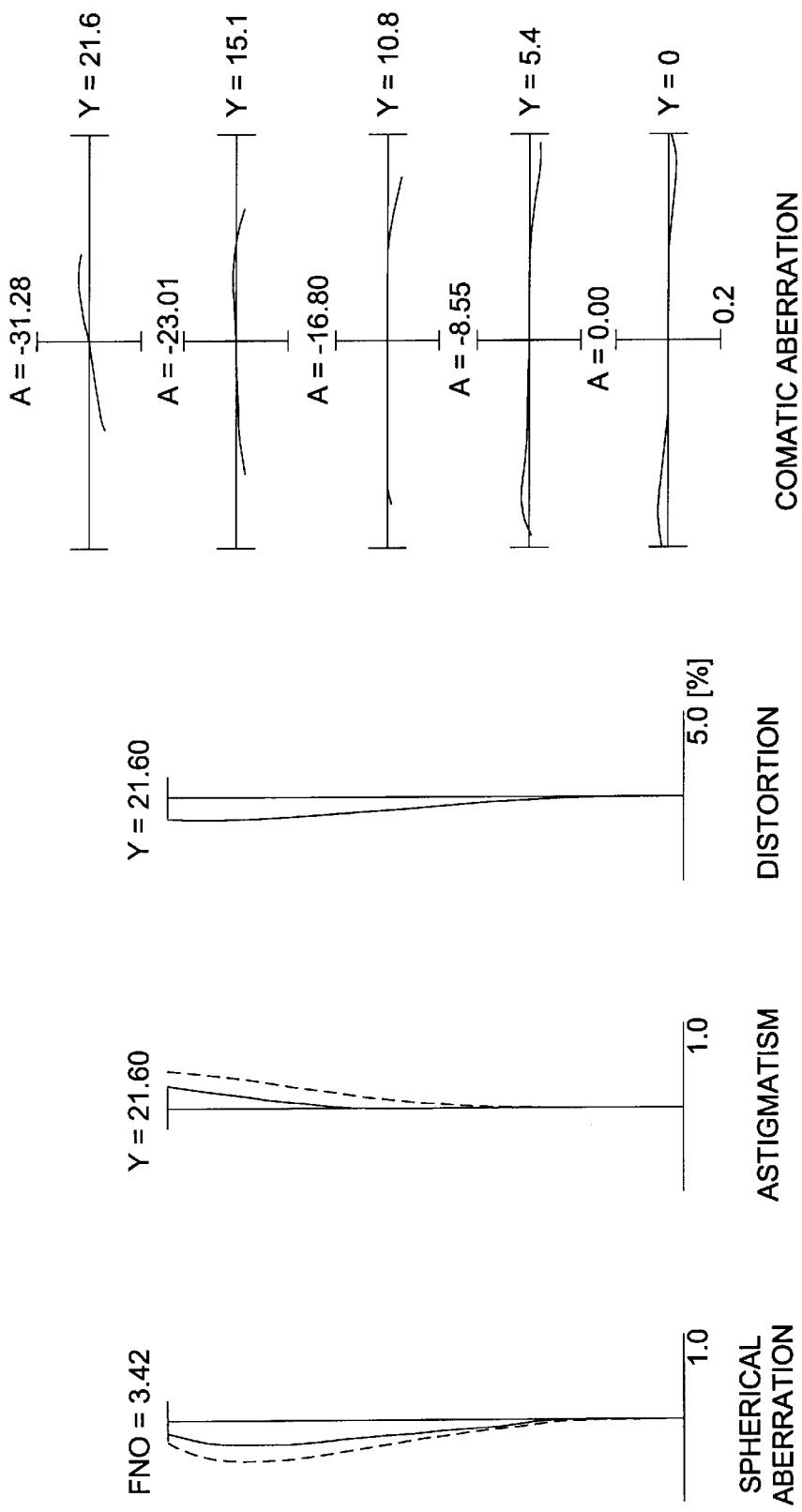

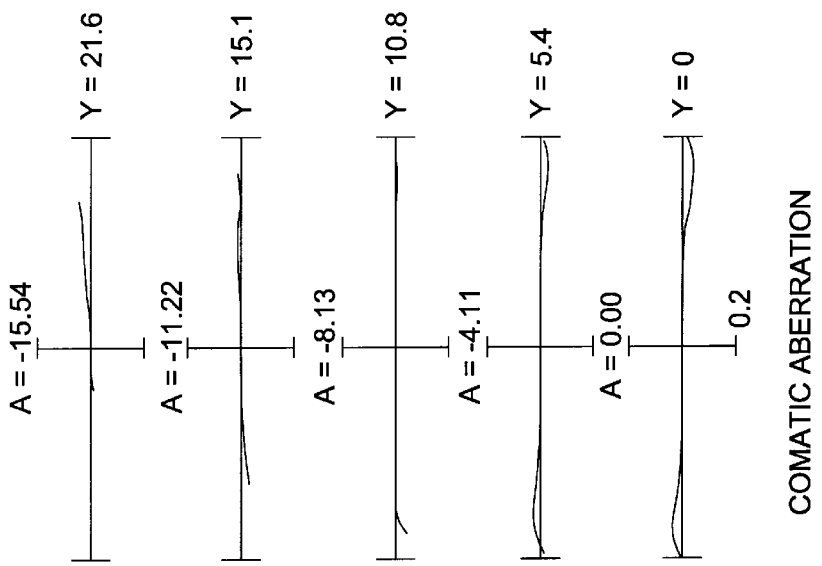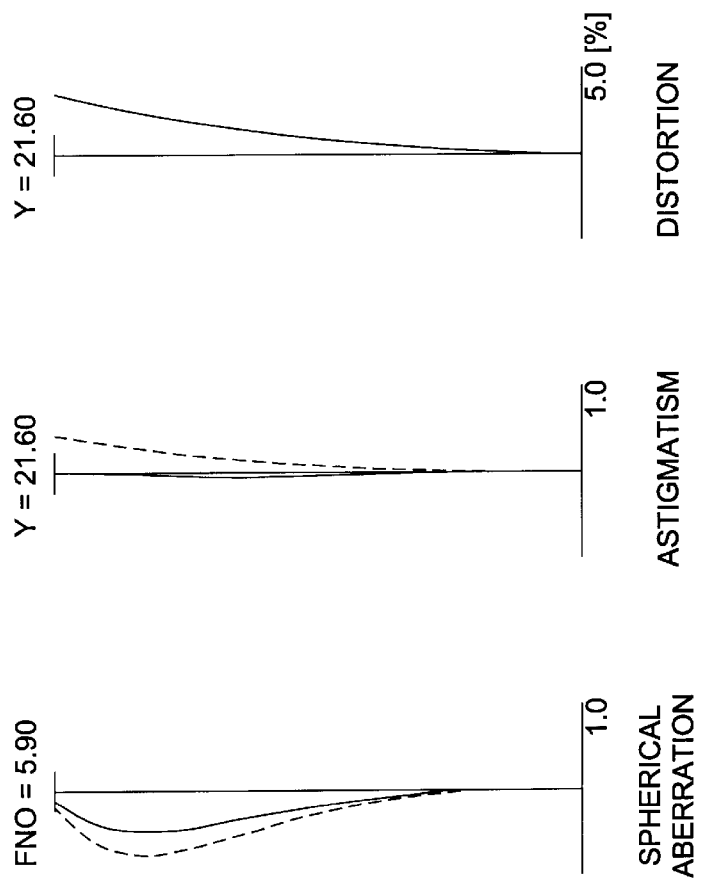

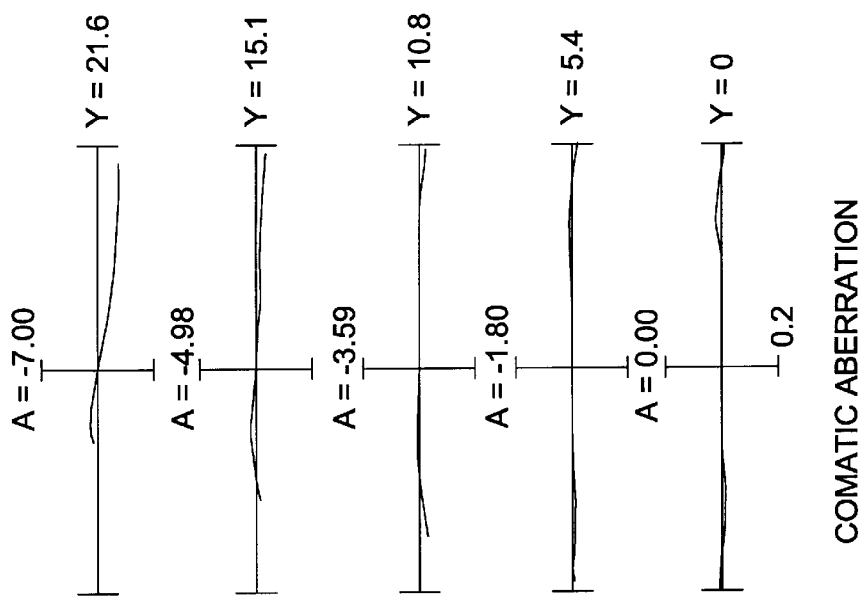
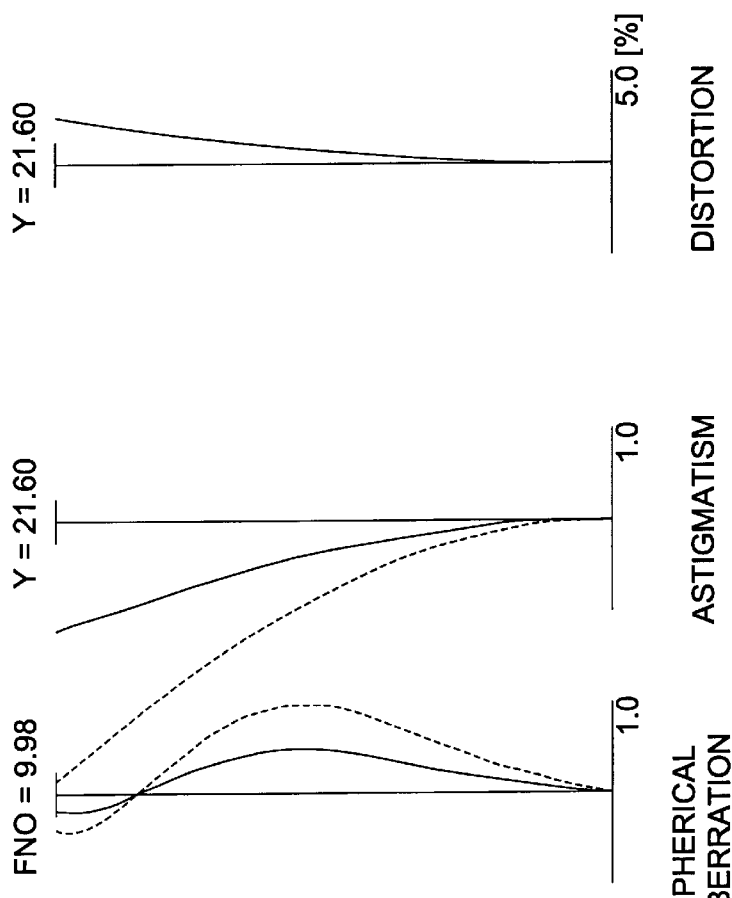
FIGURE 5(A)  FIGURE 5(B)  FIGURE 5(C)  FIGURE 5(D)

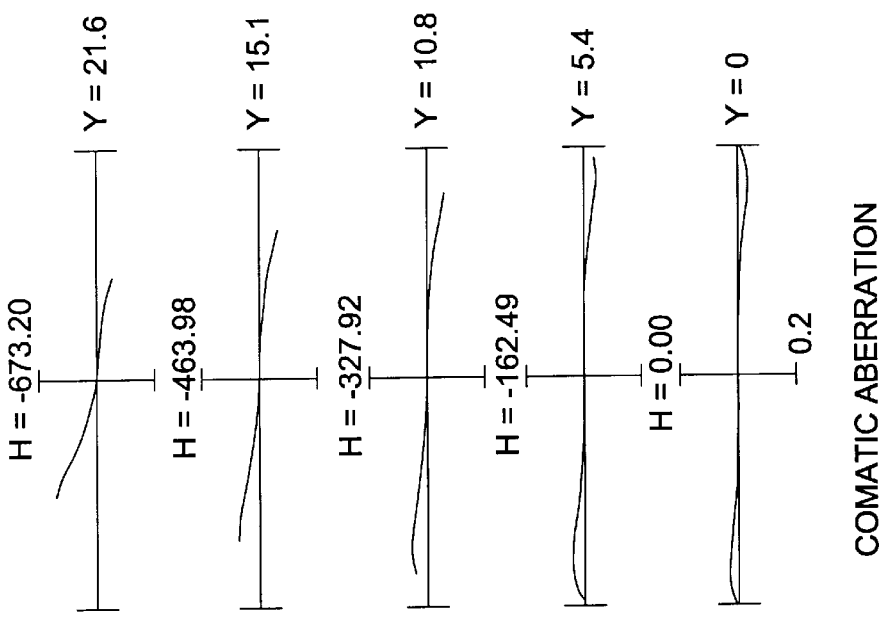
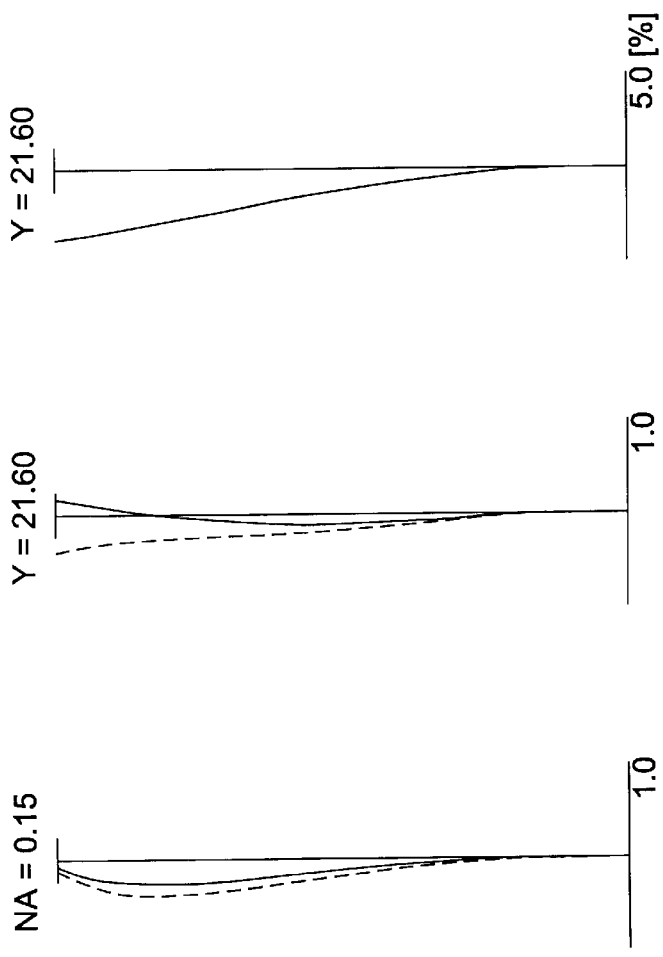

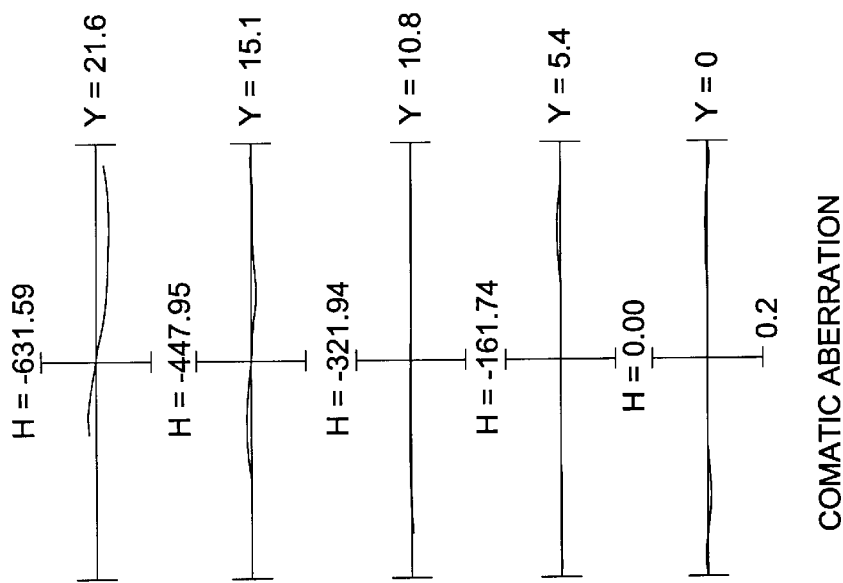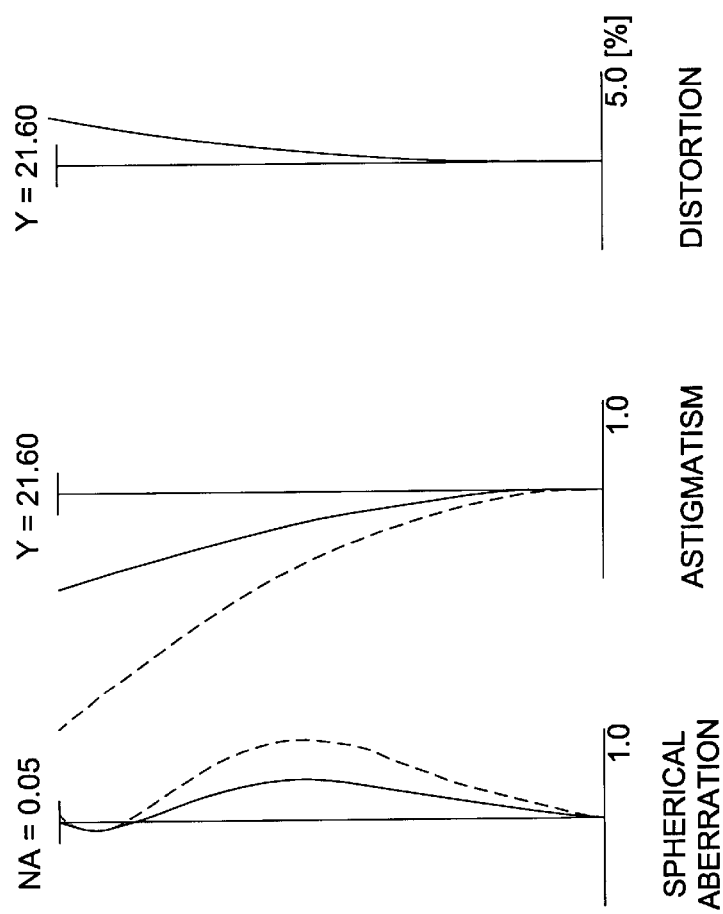
FIGURE 8(A)   FIGURE 8(B)   FIGURE 8(C)   FIGURE 8(D)

COMATIC ABERRATION

COMATIC ABERRATION

COMATIC ABERRATION

COMATIC ABERRATION

COMATIC ABERRATION

COMATIC ABERRATION

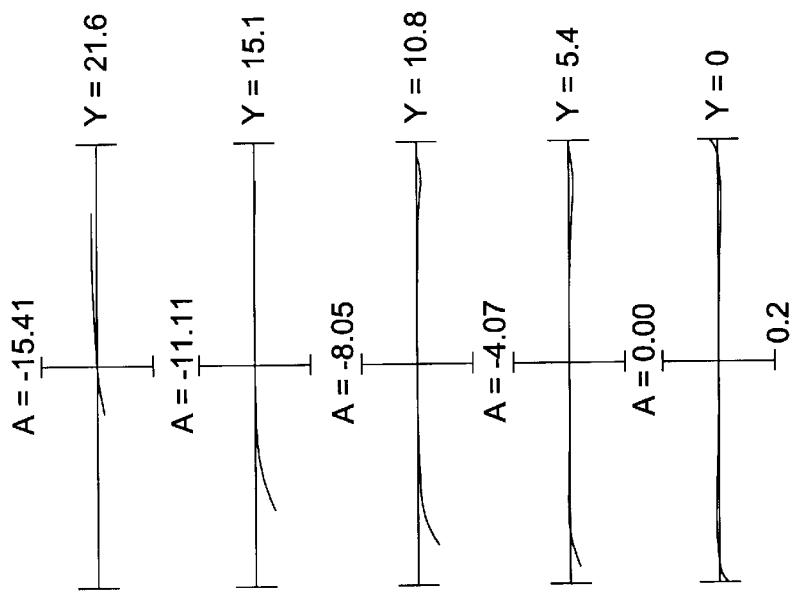
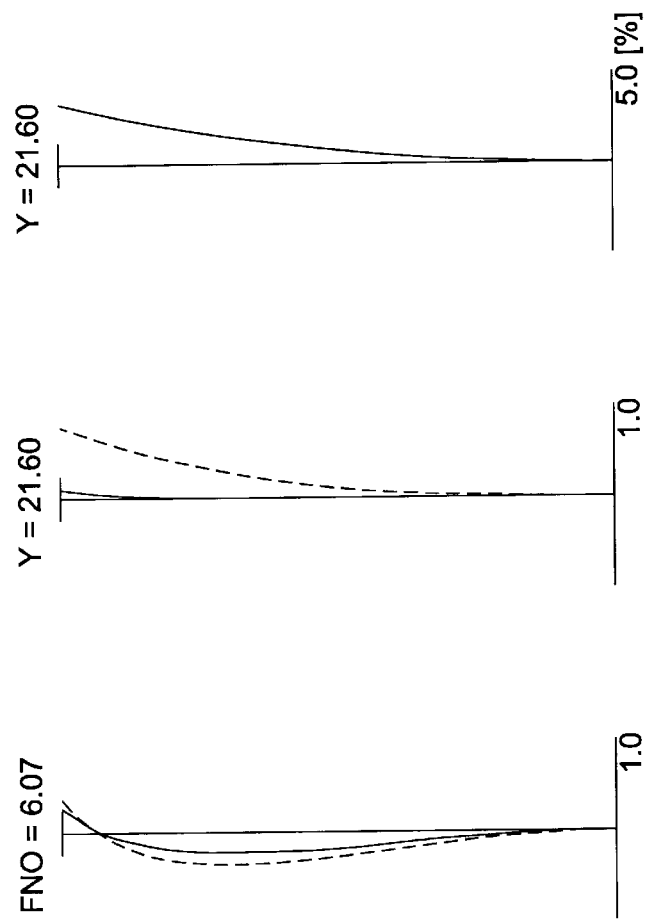
FIGURE 21(A) FIGURE 21(B) FIGURE 21(C) FIGURE 21(D)

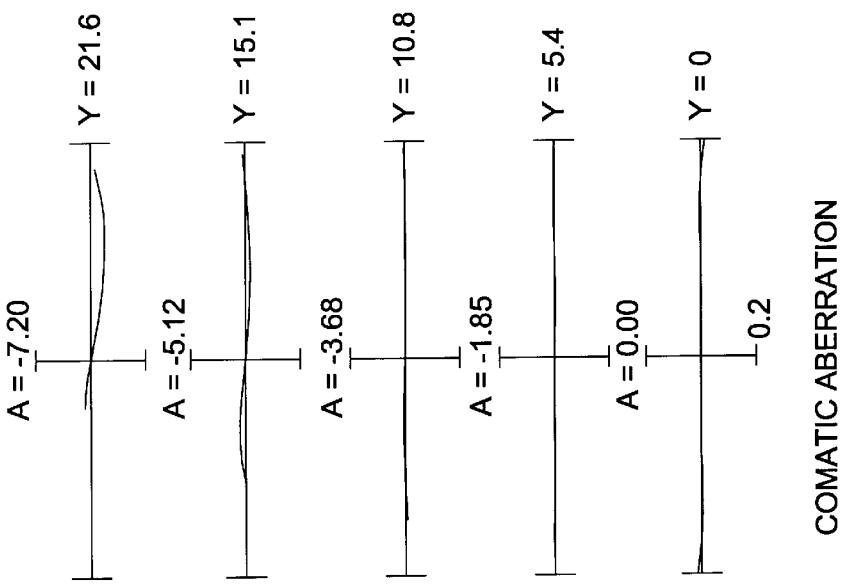
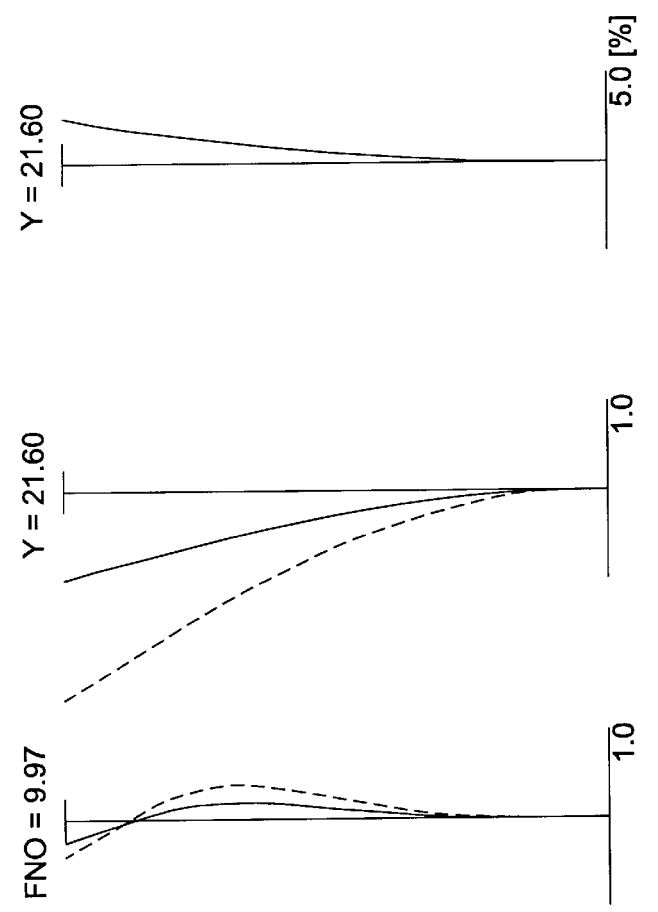
FIGURE 22(A)  FIGURE 22(B)  FIGURE 22(C)  FIGURE 22(D)

ZOOM LENS SYSTEM

This is a Continuation of application Ser. No. 08/605,543 filed Feb. 16, 1996 now abandoned.

BACKGROUND OF THE INVENTION

1. Field of the Invention

This invention relates to a zoom lens system. More particularly, this invention relates to a zoom lens system that covers a wide-angle area and also keeps good performance with high zoom ratio.

2. Background of Related Art

Conventional lens-shutter type cameras can be equipped with a zoom lens system with high zoom ratio that exceeds twice the variable power ratio. The exchangeable lenses for conventional single lens reflex cameras can also be a high variable power zoom lens that exceeds twice the zoom ratio.

Miniaturization and weight reduction of the lens system along with the camera body is also desirable. To miniaturize and reduce the weight of the lens system, total length of the lens system and the lens diameter must be reduced.

Conventional zoom lens systems having a lens group of negative refractive power arranged at the object side or a lens group of positive refractive power arranged at the object side are well known. In a high variable power zoom lens, because the maximum telephoto state focal distance becomes larger to the positive, the zoom lens system having a lens group with positive refractive power arranged at the object side reduces the total length of the lens system.

In a high variable zoom lens system that covers a wide-angle area, a zoom lens system of the positive/negative/positive/positive four-lens group type and a zoom lens system of the positive/negative/positive/negative four-lens group type are known.

For example in Japanese Patent Number Sho 57-169716, the subject matter of which is incorporated herein by reference, the zoom lens system of the positive/negative/positive/positive four-lens group type includes, in order from the object side, a first lens group of positive refractive power, a second lens group of negative refractive power, a third lens group of positive refractive power and a fourth lens group of positive refractive power. Further, during focusing from a maximum wide-angle state to a maximum telephoto state, the spacing between the first lens group and the second lens group increases, the spacing between the second lens group and the third lens group decreases, the spacing between the third lens group and the fourth lens group increases and all of the lens groups move toward the object side.

In Japanese Patent Number Sho 63-157120 and Japanese Patent Number Hei 6-265788, the subject matters of which are incorporated herein by reference, the zoom lens system of the positive/negative/positive/negative four-lens group type includes, in order from the object side, a first lens group of positive refractive power, a second lens group of negative refractive power, a third lens group of positive refractive power and a fourth lens group of negative refractive power. During focusing from the maximum wide-angle state to the maximum telephoto state, the spacing between the first lens group and the second lens group increases, the spacing between the second lens group and the third lens group decreases, the spacing between the third lens group and the fourth lens group decreases and all of the lens groups move toward the object side.

For a wide-angle area, the zoom lens system of the positive/negative/positive/positive four-lens group type is used in exchangeable lenses for single lens reflex cameras and the zoom lens system of the positive/negative/positive/negative four-lens group composition type is used in lens-shutter type cameras.

For a wide-angle zoom lens system, the back focus tends to be short. However, in a single lens reflex camera, there is a back focus restriction due to the mirror box. When the back focus becomes short in a lens shutter type camera, shadows of the dust on the rearmost surface can be recorded on the film.

In the zoom lens system disclosed in Japanese Patent Number Sho 57-169716, the second lens group includes, in order from the object side, two negative lenses, a positive lens and a negative lens. The numerous lenses in the second lens group prevent sufficient miniaturizing and weight reduction of the lens system.

Further, in the zoom lens of Japanese Patent Number Hei 63-157120, the curvature of the lens on the object side of the second lens group is small. Thus, the zoom lens system is unable to obtain a sufficient back focus in the maximum wide-angle state.

Additionally, in the zoom lens system of Japanese Patent Number Hei 6-265788, the second lens group includes a double concave lens and a positive lens that faces the convex plane of the object side. The small number of lenses in the second lens group improves minimization and weight reduction of the lens system. However, the lateral magnification change of the second lens group occurring at the time of focusing is large. Thus, the ratio of the second lens group focusing to the entire lens system focusing is too large. The result is considerable performance deteriorization occurring with mutual eccentricity between the positive lens and the double concave lens in the second lens group. In other words, the required accuracy of the eccentricity of the positive lens and the double concave lens is severe, which makes production difficult.

SUMMARY OF THE INVENTION

It is an object of this invention to provide a high variable power zoom lens system having favorable optical performance and covering a wide-angle area. It is also an object to provide a high variable power zoom lens system to solve the aforementioned problems.

The present invention includes a zoom lens system having, in order from the object side, a first lens group with positive refractive power, a second lens group with negative refractive power and a third lens group with positive refractive power. As shown in FIG. 2, the second lens group G2 includes, in order from the object side, a double concave lens L21, a positive lens L22 having the convex surface face the object side and a negative lens L23 having the concave surface face the object side. Further, the zoom lens system satisfies the following Conditions (1) and (2):

$0.8 < ra/rb < 3$            Condition (1)

$0.4 < (\beta 2w \cdot \beta 2t)^{1/2} < 0.7$            Condition (2)

In Condition (1), ra is a radius of curvature of the object side surface of the double concave lens L21 and rb is a radius of curvature of surface S23a on the object side of the negative lens L23. In Condition (2), $\beta 2w$ is a lateral magnification of the second lens group G2 in a maximum wide-angle state and $\beta 2t$ is a lateral magnification of the second lens group G2 in a maximum telephoto state.

The zoom lens system further satisfies the following Condition (3):

$$0.8 < f1/(fw \cdot ft)^{1/2} 1.4 \qquad \text{Condition (3)}$$

In Condition (3), f1 is a focal length of the first lens group G1, fw is a focal length of the lens system in the maximum wide-angle state and ft is a focal distance of the total lens system in the maximum telephoto state.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIGS. 3(A)–(D) show graphs of aberrations in the maximum wide-angle state of FIG. 2;

FIGS. 4(A)–(D) show graphs of aberrations in an intermediate focal length state of FIG. 2;

FIGS. 5(A)–(D) show graphs of aberrations in the maximum telephoto state of FIG. 2;

FIGS. 6(A)–(D) show graphs of aberrations with –1/30 magnification in the maximum wide-angle state of FIG. 2;

FIGS. 8(A)–(D) show graphs of aberrations with –1/30 magnification in the maximum telephoto state of FIG. 2;

FIGS. 21(A)–(D) shows graphs of aberrations in the intermediate focal length state of FIG. 19;

FIGS. 22(A)–(D) show graphs of aberrations in the maximum telephoto state of FIG. 19;

DETAILED DESCRIPTION OF PREFERRED EMBODIMENTS

Figure 1:
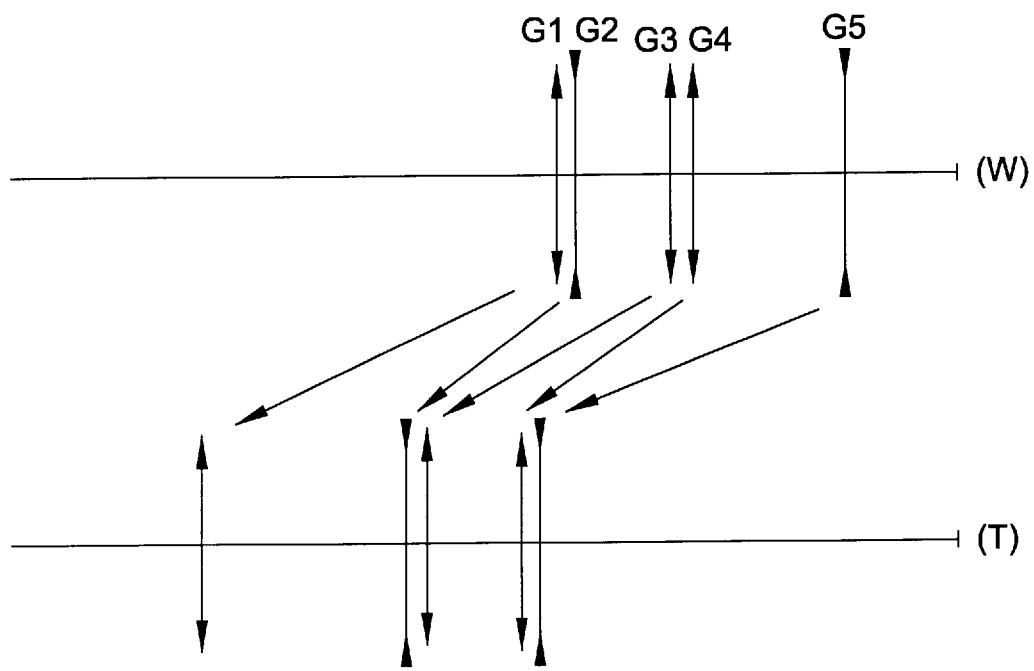
FIG. 1 is a diagram showing the refractive power distribution and movement when zooming from the maximum wide-angle state to the maximum telephoto state according to the present invention.
Figure 2:
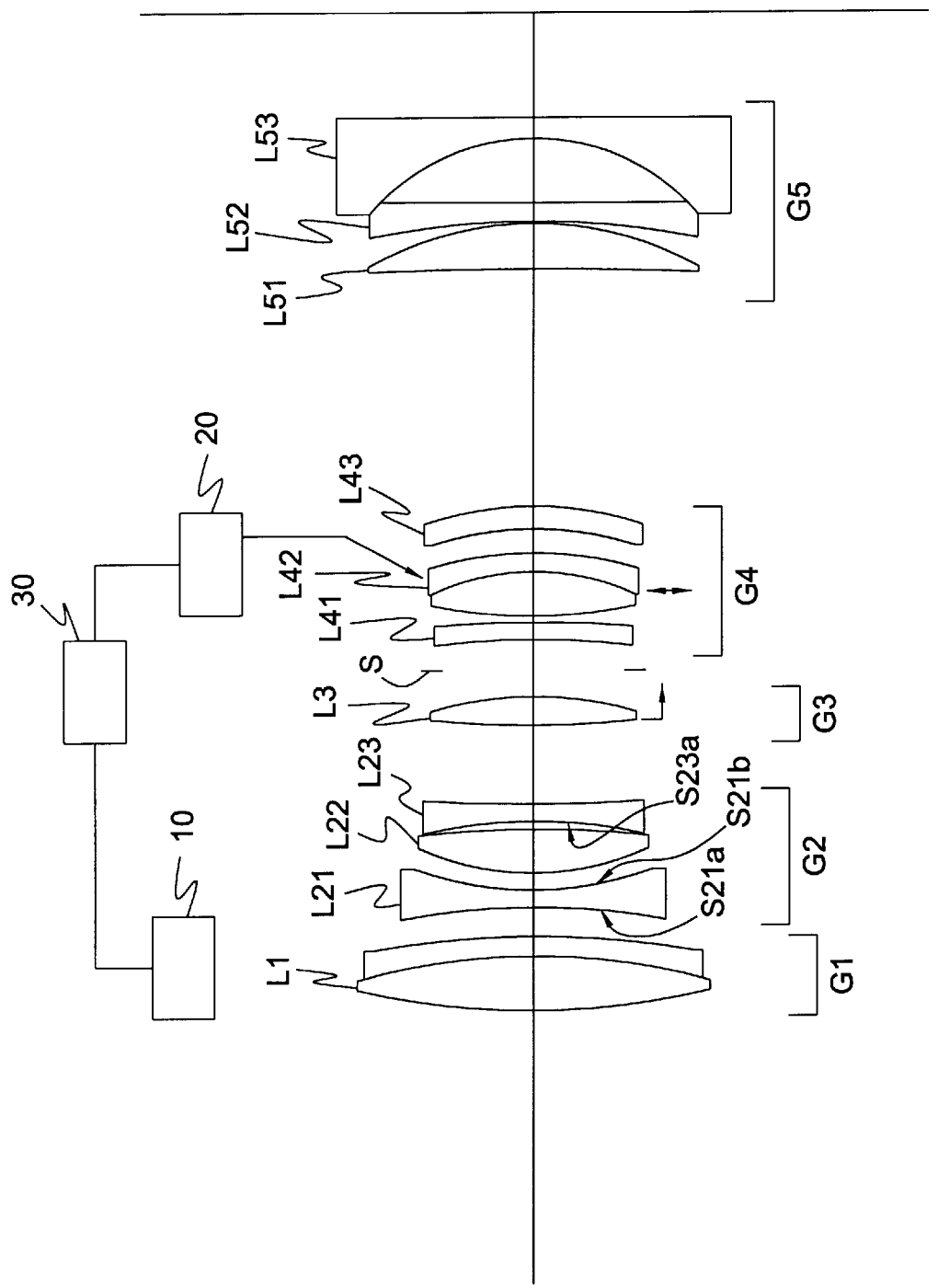
FIG. 2 shows a zoom lens system according to one embodiment of the present invention.
Figures 7A, 7B, 7C, 7D:
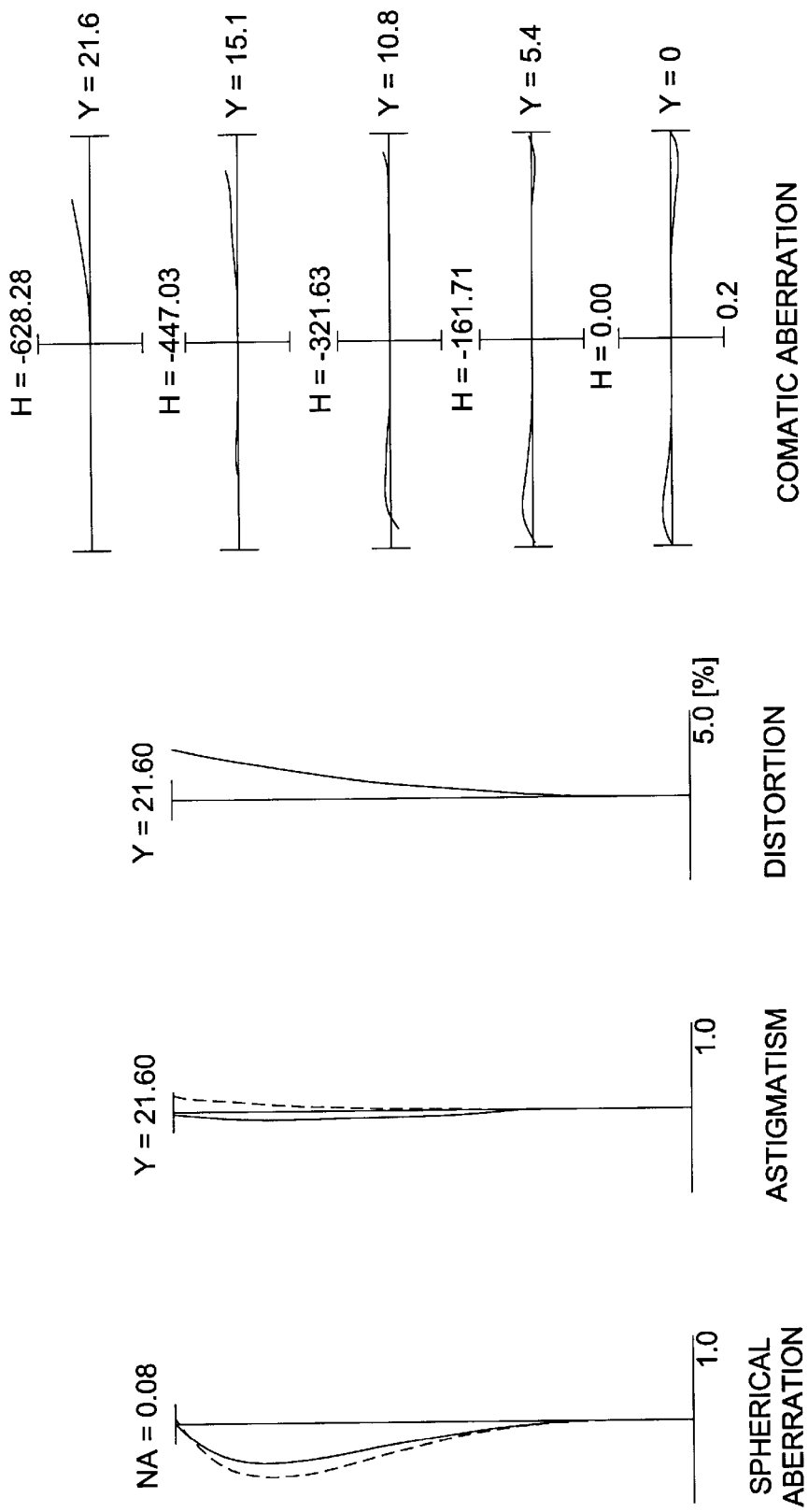
FIGS. 7(A)–(D) show graphs of aberrations with –1/30 magnification in the intermediate focal length state of FIG. 2.

As shown in FIG. 1, preferred embodiments of a zoom lens system according to the present invention include, in order from an object side, a first positive refractive power lens group G1, a second negative refractive power lens group G2, a third positive refractive power lens group G3, a fourth positive refractive power lens group G4 and a fifth negative refractive power lens group G5. When zooming from a maximum wide-angle state W to a maximum telephoto state T of the camera, the spacing between the first lens group G1 and the second lens group G2 increases, the spacing between the second lens group G2 and the third lens group G3 decreases, the spacing between the third lens group G3 and the fourth lens group G4 increases and the spacing between the fourth lens group G4 and the fifth lens group G5 decreases. Further, each lens group moves toward the object side when zooming. As shown in FIG. 2, the second lens group G2 includes, in order from the object side, a double concave lens L21, a positive lens L22 having the convex surface face the object side and a negative lens L23 having the concave surface face the object side.

The zoom lens system satisfies the following Conditions (1) and (2):

$$0.8 < ra/rb < 3 \qquad \text{Condition (1)}$$

$$0.4 < (\beta 2w \cdot \beta 2t)^{1/2} < 0.7 \qquad \text{Condition (2)}$$

In Condition (1), ra is a radius of curvature of the double concave lens L21 and rb is a radius of curvature of the surface on the object side of the negative lens L23. In Condition (2), β2w is a lateral magnification of the second lens group G2 in the maximum wide-angle state W and β2t is a lateral magnification of the second lens group G2 in the maximum telephoto state T.

The zoom lens system also satisfies the following Condition (3):

$$0.8 < f1/(fw \cdot ft)^{1/2} < 1.4 \qquad \text{Condition (3)}$$

In Condition (3), f1 is a focal length of the first lens group G1, fw is a focal distance of the total lens system in the maximum wide-angle state W and ft is a focal distance of the total lens system in the maximum telephoto state T.

To reduce the length of the lens system in the maximum telephoto state, the first lens group G1 preferably has a positive refractive power.

As described above, in conventional wide angle lens where the first lens group G1 has a positive refractive power, a sufficient back focus cannot be obtained in the maximum wide-angle state W. However, according to the present invention, the refractive power of the second lens group G2 is negative. Thus, a sufficient back focus can be obtained in the maximum wide-angle state W because the combined refractive power of the second lens group G2 and the first lens group G1 is a strong negative refractive power.

Additionally, the total length of the lens system in the maximum telephoto state T is reduced because the first lens group G1 and the second lens group G2 move toward the object side when zooming from the maximum wide-angle state W to the maximum telephoto state T. Thus, the spacing between the first lens group G1 and the second lens group G2 increases when zooming from the maximum wide-angle state W to the maximum telephoto state T.

Because the second lens group G2 has strong refractive power, correction of spherical aberration that occurs in the second lens group G2 is essential. This is especially true for high power zooming when the height of an off-axis ray that passes through the second lens group G2 does not change during zooming. However, the angle of entrance of the off-axis ray changes greatly. For this reason, variations of the off-axis aberration during focusing must be suppressed.

As described in greater detail below, a zoom lens system structure satisfying Conditions (1)–(3) provides a high variable power zoom lens system having favorable image formation performance. Each of the Conditions (1)–(3) is explained below.

Condition (1) determines the corrected back focus between the on-axis aberration and the off-axis aberration. Condition (1) further regulates the ratio ra/rb of the lens components of the second lens group G2 (i.e., the radius of curvature of the double concave lens L21 to the radius of curvature of the negative lens L23).

If the upper limit of Condition (1) is exceeded, correction of the positive spherical aberration that occurs in the second lens group G2 cannot occur. Then, spherical aberration variations that occur during zooming cannot be suppressed.

On the other hand, if the lower limit of Condition (1) is breached, correction of off-axis aberration variations that occur in the second lens group G2 during zooming cannot be corrected.

The upper limit of Condition (1) may be set to 2.25 and the lower limit may be set to 1.1 to obtain more excellent performance.

Condition (2) regulates the second lens group G2 lateral magnification. In particular, the average lateral magnification for the second lens group G2 is determined by the square root of the product of the lateral magnification β2t in the maximum telephoto state and the lateral magnification β2w in the maximum wide-angle state.

If the upper limit of Condition (2) is exceeded, the combined refractive power of the first lens group G1 and the second lens group G2 is slightly negative. Thus, a sufficient back focus in the maximum wide-angle state cannot be obtained.

On the other hand, if the lower limit of Condition (2) is breached, the combined refractive power of the first lens group G1 and the second lens group G2 is excessively negative. Then, the divergent operation becomes too strong and the total length of the lens system in the maximum telephoto state T becomes too large.

Condition (3) regulates the focal length of the first lens group G1. The zoom lens system satisfies Condition (3) to minimize the total length of the lens system in the telephoto state and maintain the balance of minimizing the lens diameter of the first lens group G1.

In the case where the upper limit of Condition (3) is exceeded, the focal length of the first lens group G1 is large causing the total length of the lens system to be large in the maximum telephoto state.

On the other hand, when the lower limit of Condition (3) is breached, the focal length of the first lens group G1 is small causing the total length of the lens system to be small in the maximum telephoto state T, which allows miniaturization of the lens system. However, in the maximum wide-angle state W, the off-axis ray passing through the first lens group G1 separates from the optical axis. Therefore, the lens diameter of the first lens group G1 must be increased.

To further reduce the total length of the lens system in the maximum telephoto state T and thereby reduce the camera size, the upper limit in Condition (3) may be set to 1.25.

Further considerations relating to a high variable power zoom lens system are also incorporated into the present invention. For example, with a negative-positive two-group zoom lens system including two moveable lens groups, only one lens group includes variable power for high power zooming. Thus, variations of various aberrations during zooming cannot be suppressed. However, when determining high power zooming using a "multiple group zoom lens" including three or more moveable lens groups, the ratio of the variable power of each lens group is controllable because there are many lens groups having variable power. Therefore, variations of the various aberrations during zooming can be suppressed.

However, because there are many moveable lens groups in a multiple group zoom lens system, the lens barrel construction becomes complicated and controlling the mutual eccentricity suppression of each lens group is possible even though difficult.

To suppress the various aberration variations that occur in the second lens group G2 when determining high power zooming, at least two lens groups are arranged on the image side from the second lens group G2. The spacing of the at least two lens groups are changed when zooming. Further, the ratio of the variable power of the second lens group G2 is preferably reduced.

Additionally, when determining the total length of the lens system in the maximum telephoto state T, the refractive power arrangement in the maximum telephoto state becomes extremely non-symmetrical. Thus, over the focal distance range from the maximum wide-angle state W to the maximum telephoto state T, the combined refractive power of the first lens group G1 and the second lens group G2 is preferably always negative. Because the refractive power of the entire lens system is positive, variations of the off-axis aberrations that occur during variable power can be suppressed. Thus, more than two lens groups having positive refractive power are preferably arranged on the image side of the second lens group G2 to obtain favorable image formation with off-axis aberrations.

The zoom lens system of this invention preferably also satisfies the following Condition (4):

$$0.2 < |f2|/(fw \cdot ft)^{1/2} < 0.4 \qquad \text{Condition (4)}$$

In Condition (4), f2 is a focal distance of the second lens group G2. Thus, Condition (4) regulates the focal distance of the second lens group G2.

In the case, when the upper limit of Condition (4) is exceeded, a sufficient back focus of the maximum telephoto state T cannot be obtained. In addition, the off-axis ray passing through the second lens group G2 in the maximum wide-angle state W separates from the optical axis and comatic aberration variations due to the angle of view cannot be suppressed.

On the other hand, when the lower limit of Condition (4) is breached, the compactness of the total lens system in the maximum telephoto state T is not sufficient. In addition, because the height of the off-axis ray passing through the second lens group G2 approaches the optical axis, off-axis aberrations and on-axis aberrations cannot be independently corrected. Therefore, off-axis aberration variations that occur at the time of variable power cannot be suppressed.

Additionally, this invention preferably satisfies the following Condition (5) to suppress the various aberration variations that occur in the second lens group G2 when zooming from the maximum wide-angle state to the maximum telephoto state:

$$0.28 < (\beta 2t/\beta 2w)/(ft/fw) < 0.52 \qquad \text{Condition (5)}$$

Condition (5) regulates the ratio of the variable power of the second lens group G2 to the variable power of the entire lens system.

When the upper limit of Condition (5) is exceeded, the ratio of variable power of the second lens group G2 is too large. Further, on-axis aberration variations that occur at the time of variable power becomes too large.

On the other hand, when the lower limit of Condition (5) is breached, the ratio of variable power of the second lens group G2 is small, but the burden of the variable power of the lens groups other than the second lens group G2 becomes too large and various aberration variations cannot be suppressed.

Because there is no restriction on the back focus when applying the zoom lens system of this invention to a lens shutter type camera, the negative lens group is preferably positioned closest to the image side. Further, arranging the negative lens group closest image side and two positive lens groups on the object side and adjacent to the negative lens group allows high power zooming.

Also, more than two lens groups may move integrally along the optical path when zooming from the maximum wide-angle state to the maximum telephoto state.

A zoom lens system according to a first preferred embodiment is shown in FIG. 2.

A first lens group G1 includes a double convex lens L1 with a cemented positive lens having a negative meniscus lens with the concave surface facing the object side. A second lens group G2 includes a double concave lens L21, a double convex lens L22 and a double concave lens L23. A third lens group G3 includes a double convex lens L3. A fourth lens group G4 includes a negative meniscus lens L41 with the concave surface facing the object side, a positive lens L42 having a negative meniscus lens with the concave surface facing the object side cemented to a double convex lens, and a positive meniscus lens L43 with the concave surface facing the object side. A fifth lens group G5 includes a positive meniscus lens L51 with the concave surface facing the object side, a negative meniscus lens L52 with the concave surface facing the object side and a negative meniscus lens L53 with the concave surface facing the object side.

An aperture diaphragm S is located between the third lens group G3 and the fourth lens group G4 to move integrally with the fourth lens group G4 when focusing from the maximum wide-angle state W to the maximum telephoto state T.

The positional relationship of each lens group in the maximum wide-angle state W moves on an optical path along a zoom orbit (shown by arrows in FIG. 1) when zooming to the maximum telephoto state T.

As shown in FIG. 2, the zoom lens system further includes a sensor 10 to detect a joggle of the zoom lens system, an actuator 20 to move the cemented positive lens L42 in a direction that orthogonally crosses the optical axis (shown by arrows in FIG. 2) and a controller 30 to control the actuator 20 based on the output from the sensor 10.

The cemented positive lens L42 moves in the orthogonal direction to the optical path to make the image shift. Therefore, image blur caused by a shaking of the camera can be corrected.

Additionally, the third lens group G3 moves along the optical path to perform close distance object focusing.

The value of various items of preferred embodiments are given in the following Tables. In the Tables, f is a focal distance, F No. is a F number, 2w is an angle of view, and Bf is a back focus. Further, the number in the far left column indicates the order of the lens from the object side and increasing along the direction in which a light ray proceeds. The Tables also include the refractive indices and the Abbe numbers corresponding to a d-line (1=587.6 nm).

The non-spherical shape of a surface is given by the following Condition (6):

$$S(y) = (y^2/R)/[1 + (1 - k \cdot y^2/R^2)^{1/2}] + \qquad \text{Condition (6)}$$
$$C_2 \cdot y^2 + C_4 \cdot y^4 + C_6 \cdot y^6 + C_8 \cdot y^8 + C_{10} \cdot y^{10} + \ldots$$

In Condition (6), y is a height measured in the direction perpendicular to the optical axis, S(y) is magnitude of displacement of the height y, R is a standard radius of curvature (the radius of curvature at the peak), k is a conical constant and $C_n$ is a non-spherical constant.

In addition, a paraxial radius of curvature r is defined by the following Condition (7):

$$r = 1/(2 \cdot C_2 + 1/R) \qquad \text{Condition (7)}$$

Non-spherical planes of the various items in any of the following Tables are indicated by an * to the right of the surface number in the left most column. Moreover, the code number of S(y) is positive in the direction traveling with the light ray.

Table 1 gives the value of various items of the first preferred embodiment.

TABLE 1 f = 36.00~75.00~171.25 mm
F No = 3.44~5.92~10.00
2w = 62.55~31.09~14.01°

| Surface Number | Radius of Curvature | Intersurface Distance | Abbe no. | Refractive Index |
|---|---|---|---|---|
| 1 | 64.4581 | 4.000 | 70.41 | 1.48749 |
| 2 | −36.9722 | 1.375 | 23.01 | 1.86074 |
| 3 | −56.7475 | (d3 = variable) | | |
| 4 | −33.5253 | 1.125 | 44.54 | 1.81550 |
| 5 | 24.1962 | 1.250 | | |
| 6 | 20.7363 | 3.125 | 25.50 | 1.80458 |
| 7 | −58.5771 | 0.625 | | |
| 8 | −26.7377 | 1.125 | 44.54 | 1.81550 |
| 9 | 110.9249 | (d9 = variable) | | |
| 10 | 85.8044 | 2.125 | 64.10 | 1.51680 |
| 11 | −24.8231 | (d11 = variable) | | |
| 12 | ∞ | 2.250 | (Aperture) | |
| 13* | −42.0350 | 1.250 | 30.24 | 1.58518 |
| 14 | −62.4264 | 0.375 | | |
| 15 | 32.7070 | 3.375 | 70.41 | 1.48749 |
| 16 | −13.7978 | 1.250 | 23.01 | 1.86074 |
| 17 | −22.0324 | 1.750 | | |
| 18 | −25.0000 | 1.625 | 57.57 | 1.49108 |
| 19 | −20.8237 | (d19 = variable) | | |
| 20 | −95.9566 | 3.125 | 25.50 | 1.80458 |
| 21 | −23.7547 | 0.125 | | |
| 22 | −45.4547 | 1.250 | 46.51 | 1.80420 |
| 23 | −291.6725 | 4.625 | | |
| 24 | −15.3382 | 1.500 | 44.54 | 1.81550 |
| 25 | −614.1443 | (Bf) | | |

| k | $C_2$ | $C_4$ | $C_6$ | $C_8$ | $C_{10}$ |
|---|---|---|---|---|---|
| 1.0000 | 0.0000 | −2.0590 × $10^5$ | 1.3875 × $10^8$ | −1.0571 × $10^{-9}$ | −4.3080 × $10^{-12}$ |

*indicates non-spherical data (e.g., plane 13)

The variable spacing that occurs while zooming.

| f   | 35.9994 | 74.9995 | 171.2472 |
|-----|---------|---------|----------|
| d3  | 2.1250  | 12.2703 | 23.5222  |
| d9  | 5.5759  | 4.4709  | 1.2500   |
| d11 | 1.9251  | 3.0301  | 6.2510   |
| d19 | 17.2230 | 7.6584  | 1.8688   |
| Bf  | 7.5000  | 32.4216 | 74.6205  |

The focusing movement amount of the third lens group G3 at the time of −1/30 photographic magnification.

| f               | 35.9994 | 74.9995 | 171.2472 |
|-----------------|---------|---------|----------|
| Movement amount | 0.8082  | 0.6045  | 0.5653   |

Movement toward the image surface from the object side is positive.

The Movement Amount of Lens Component L42 when an Image is Shifted Only 0.01 radian.

| f                         | 35.9994 | 74.9995 | 171.2472 |
|---------------------------|---------|---------|----------|
| Movement amount of the lens | 0.3086 | 0.3758  | 0.5104   |
| Shifting amount of the image | 0.3600 | 0.7500 | 1.7125   |

Corresponding values for Conditions (1)–(5) are as follows:
(1) $ra/rb=1.254$;
(2) $(\beta 2w \cdot \beta 2t)^{1/2}=0.583$;
(3) $f1/(fw \cdot ft)^{1/2}=1.029$;
(4) $|f2|/(fw \cdot ft)^{1/2}=0.293$; and
(5) $(\beta 2t/\beta 2w)/(ft/fw)=0.359$.

FIGS. 3–8 depict the various aberration figures corresponding to the d-line (l=587.6 nm) of the first preferred embodiment. The various aberration of the maximum wide-angle state W are shown in FIGS. 3(A)–(D). The various aberration figures in the infinite focus state of the intermediate focal length state are shown in FIGS. 4(A)–(D). The various aberration figures in the infinite focus state of the maximum telephoto state T are shown in FIG. 5(A)–(D).

The various aberration diagrams at the time of −1/30 magnification of the maximum wide-angle state W are shown in FIGS. 6(A)–6(D). The various aberration diagrams at the time of −1/30 photographic of the intermediate focal length state are shown in FIGS. 7(A)–7(D). The various aberration diagrams at the time of −1/30 magnification of the maximum telephoto state T are shown in FIGS. 8(A)–8(D).

For the first preferred embodiment, the comatic aberration diagrams according to the d-line (l=587.6 nm) are shown in FIGS. 9–14.

Figure 9:
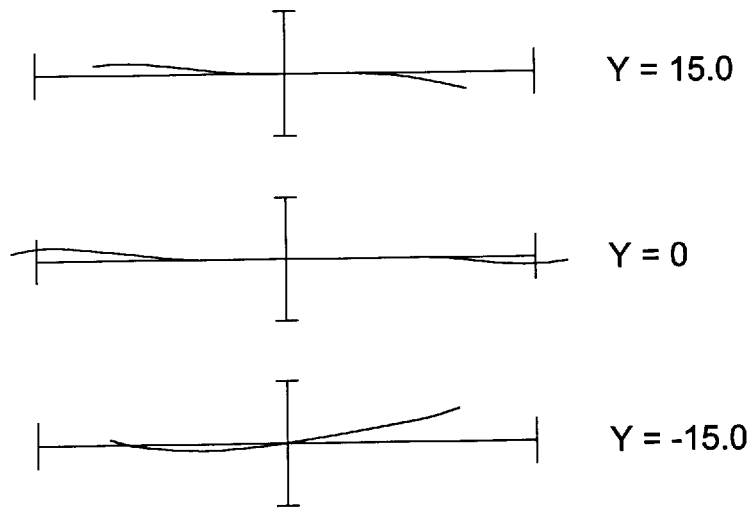
FIG. 9 shows the comatic aberrations at the time of image shifting in the maximum wide-angle state of FIG. 2.
Figure 10:
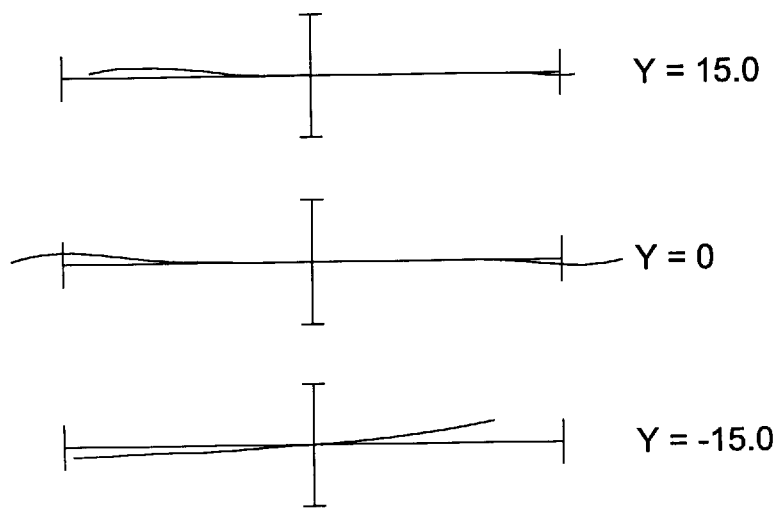
FIG. 10 shows the comatic aberrations at the time of image shifting in the intermediate focal length state of FIG. 2.
Figure 11:
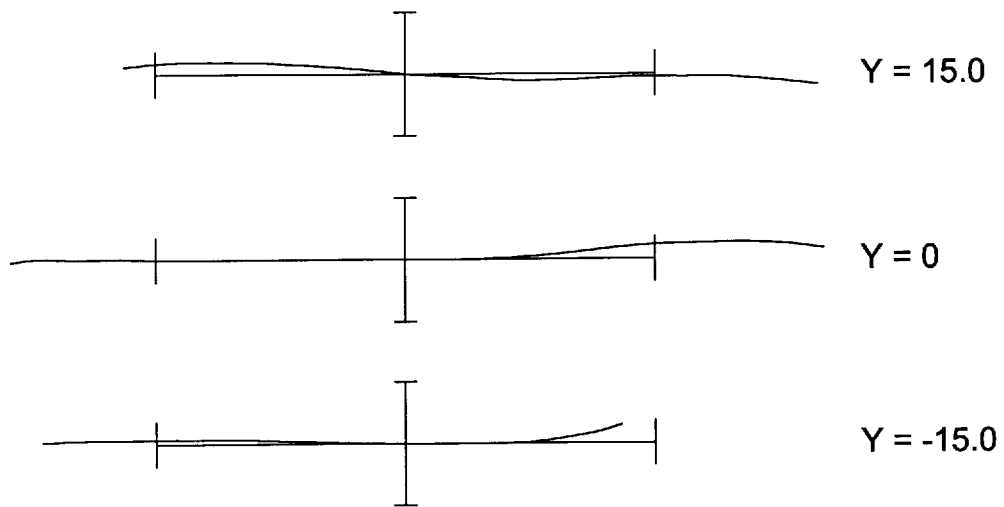
FIG. 11 shows the comatic aberrations at the time of image shifting in the maximum telephoto state of FIG. 2.
Figure 12:
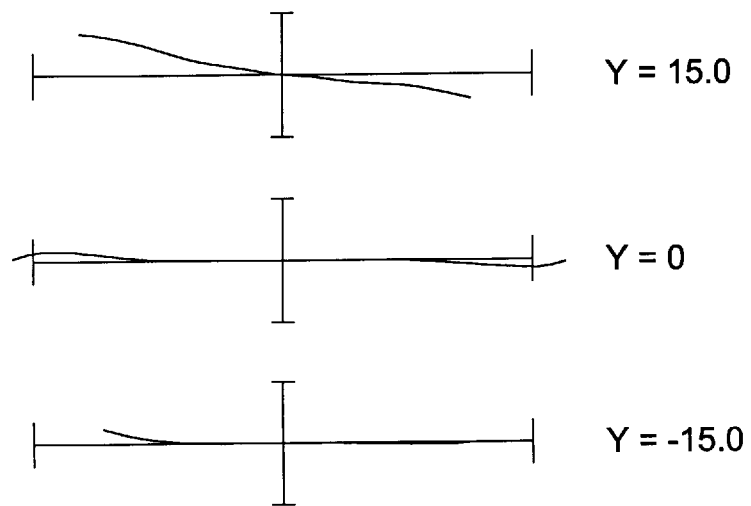
FIG. 12 shows the comatic aberrations at the time of image shifting with –1/30 magnification in the maximum wide-angle state of FIG. 2.
Figure 13:
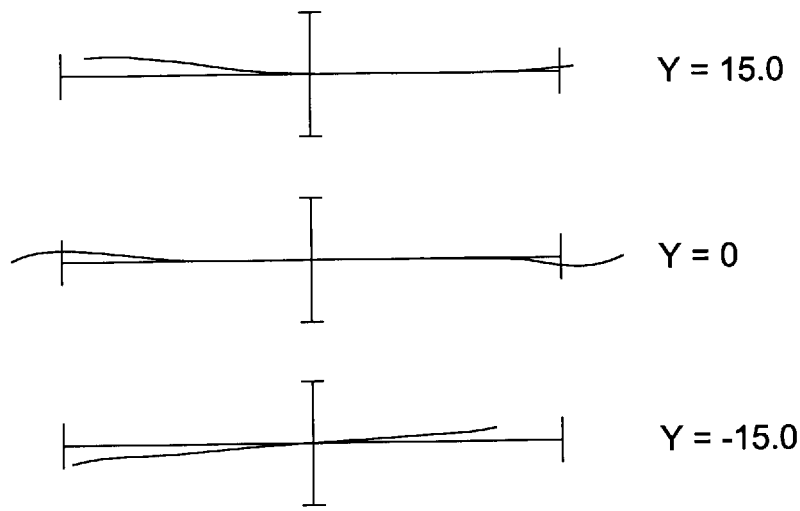
FIG. 13 shows the comatic aberrations at the time of image shifting with –1/30 magnification in the intermediate focal length state of FIG. 2.
Figure 14:
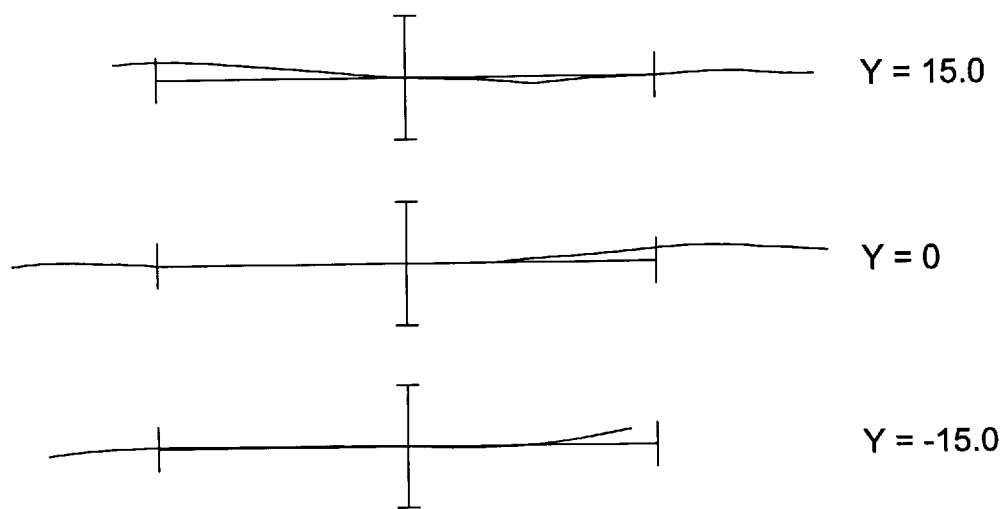
FIG. 14 shows the comatic aberrations at the time of image shifting with –1/30 magnification in the maximum telephoto state of FIG. 2.

When the image is shifted only 0.01 radian according to the optical axis of the first preferred embodiment, FIG. 9 shows the comatic aberrations of the infinite focus state of the maximum wide-angle state W. Further, FIG. 10 shows the comatic aberrations in the intermediate focal length state and FIG. 11 shows the comatic aberrations in the maximum telephoto state T. In addition, FIG. 12 shows the comatic aberrations of −1/30 magnification in the maximum wide-angle state W. FIG. 13 shows the intermediate focal length state and FIG. 14 shows the maximum telephoto state.

In each of FIGS. 3–8, 16–18, 20–22 and 24–26, F No. is a F number, NA is a numerical aperture, Y is the image height, A is the angle of view according to each image height and H is the object height. Further, in the figures showing the astigmatism, solid lines indicate sagittal image surfaces while broken lines indicate meridional image surfaces. In addition, in the figures showing spherical aberration, broken lines depict a sine condition.

Each of FIGS. 9–14 show the comatic aberration at Y=15.0, 0, −15.0 when the lens L42 is moved in a positive direction of the image height Y.

Each of the aberration figures show various aberrations occurring in each of the photographic distance states can be corrected even during image shifting.

Figure 15:
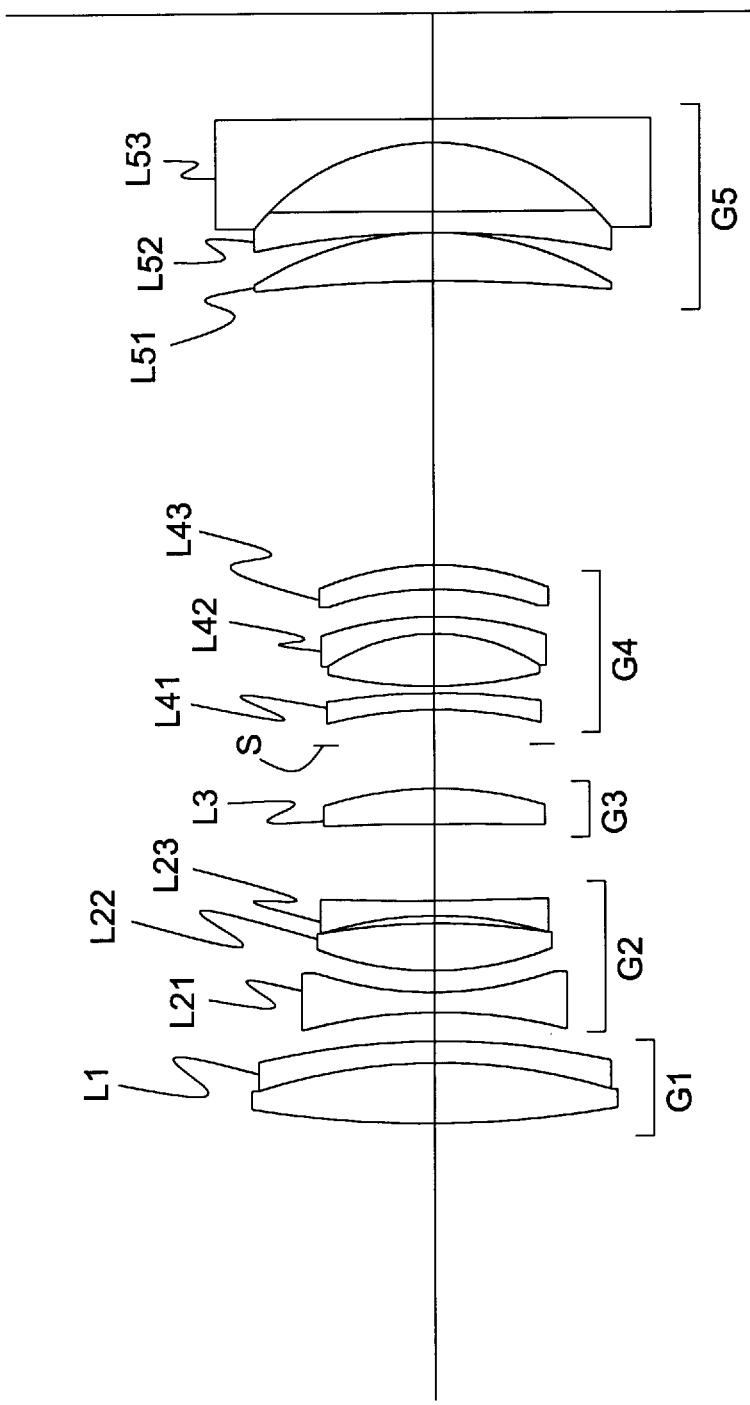
FIG. 15 shows a zoom lens system according to another embodiment of the present invention.

A zoom lens system according to a second preferred embodiment is shown in FIG. 15.

A first lens group GI includes a double convex lens and a cemented positive lens L21 having a negative meniscus lens with the concave surface facing the object side. A second lens group G2 includes a double concave lens L21, a double convex lens L22 and a negative meniscus lens L23 with a double concave surface facing the object side. A third lens group G3 includes a positive meniscus lens L3 with a concave surface facing the object side. A fourth lens group G4 includes a negative meniscus lens L41 with the concave surface facing the object side, a cemented positive lens L42 having a negative meniscus lens with a concave surface facing the object side and a double convex lens, and a positive meniscus lens L43 with the concave surface facing the object side. A fifth lens group G5 includes a positive meniscus lens L51 with the concave surface facing the object side, a negative meniscus lens L52 with the concave surface facing the object side and a double concave lens L53.

In addition, an aperture diaphragm S is positioned between the third lens group G3 and the fourth lens group G4. The aperture S moves integrally with the fourth lens group G4 when zooming from the maximum wide-angle state W to the maximum telephoto state T.

The positional relationship of each lens group in the maximum wide-angle state W moves on an optical path along the zoom orbit (shown by arrows in FIG. 1) when zooming to the maximum telephoto state T.

Table (2) gives the value of various items of the second preferred embodiment.

TABLE 2 f = 36.00~75.00~171.25 mm
F No = 3.44~5.92~10.00
2w = 62.60~31.09~14.01°

| Surface Number | Radius of Curvature | Intersurface Distance | Abbe no. | Refractive Index |
|----------------|---------------------|-----------------------|----------|------------------|
| 1   | 76.1063    | 4.000            | 70.41     | 1.48749 |
| 2   | −38.6959   | 1.375            | 23.01     | 1.86074 |
| 3   | −59.7967   | (d3 = variable)  |           |         |
| 4   | −32.2454   | 1.125            | 44.54     | 1.81550 |
| 5   | 23.2628    | 1.250            |           |         |
| 6   | 20.9504    | 3.125            | 25.50     | 1.80458 |
| 7   | −58.3991   | 0.625            |           |         |
| 8   | −24.9827   | 1.125            | 44.54     | 1.81550 |
| 9   | −8147.8850 | (d9 = variable)  |           |         |
| 10  | −3267.0957 | 2.125            | 64.10     | 1.51680 |
| 11  | −22.0500   | (d11 = variable) |           |         |
| 12  | ∞          | 2.250            | (Aperture)|         |
| 13* | −42.0350   | 1.250            | 30.24     | 1.58518 |
| 14  | −62.4264   | 0.375            |           |         |
| 15  | 29.5534    | 3.375            | 70.41     | 1.48749 |
| 16  | −13.8554   | 1.250            | 23.01     | 1.86074 |
| 17  | −22.4913   | 1.750            |           |         |
| 18  | −25.0000   | 1.625            | 57.57     | 1.49108 |
| 19  | −20.8237   | (d19 = variable) |           |         |
| 20  | −133.6625  | 3.125            | 25.50     | 1.80458 |
| 21  | −24.1550   | 0.125            |           |         |
| 22  | −44.7686   | 1.250            | 46.51     | 1.80420 |

TABLE 2-continued

| 23 | −256.6016 | 4.625 | | |
|----|-----------|-------|-------|---------|
| 24 | −15.5385  | 1.500 | 44.54 | 1.81550 |
| 25 | 1974.3152 | (Bf)  | | |

| k | $C_2$ | $C_4$ | $C_6$ | $C_8$ | $C_{10}$ |
|---|-------|-------|-------|-------|----------|
| 1.0000 | 0.0000 | −1.8947 × $10^{-5}$ | −5.2465 × $10^{-8}$ | 9.2663 × $10^{-10}$ | −2.3836 × $10^{-11}$ |

*non-aspherical data

The variable spacing that occurs in zooming.

| f   | 36.0000 | 75.0000 | 171.2499 |
|-----|---------|---------|----------|
| d3  | 2.1250  | 12.9749 | 28.2736  |
| d9  | 5.0000  | 3.1084  | 1.2500   |
| d11 | 2.9718  | 4.8634  | 6.7218   |
| d19 | 18.4888 | 9.2304  | 1.8688   |
| Bf  | 7.5001  | 31.9616 | 76.4668  |

Corresponding values for Conditions (1)–(5) are as follows:
(1) ra/rb=1.291;
(2) $(\beta 2w \cdot \beta 2t)^{1/2}$=0.542;
(3) $f1/(fw \cdot ft)^{1/2}$=1.147;
(4) $|f2|/(fw \cdot ft)^{1/2}$=0.317; and
(5) $(\beta 2t/\beta 2w)/(ft \cdot fw)$=0.369.

Figures 16A, 16B, 16C, 16D:
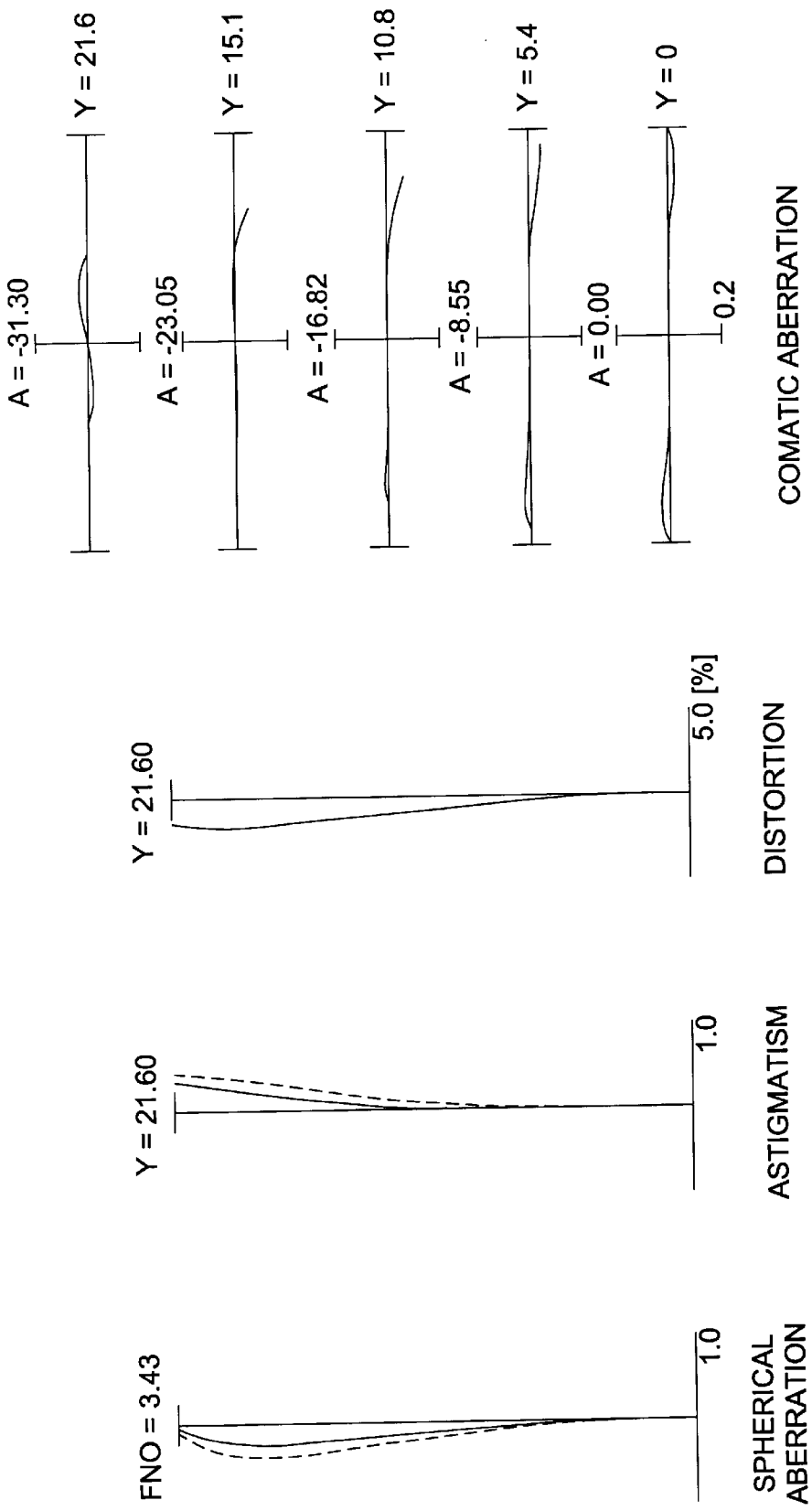
FIGS. 16(A)–(D) show graphs of aberrations in the maximum wide-angle state of FIG. 15.
Figures 17A, 17B, 17C, 17D:
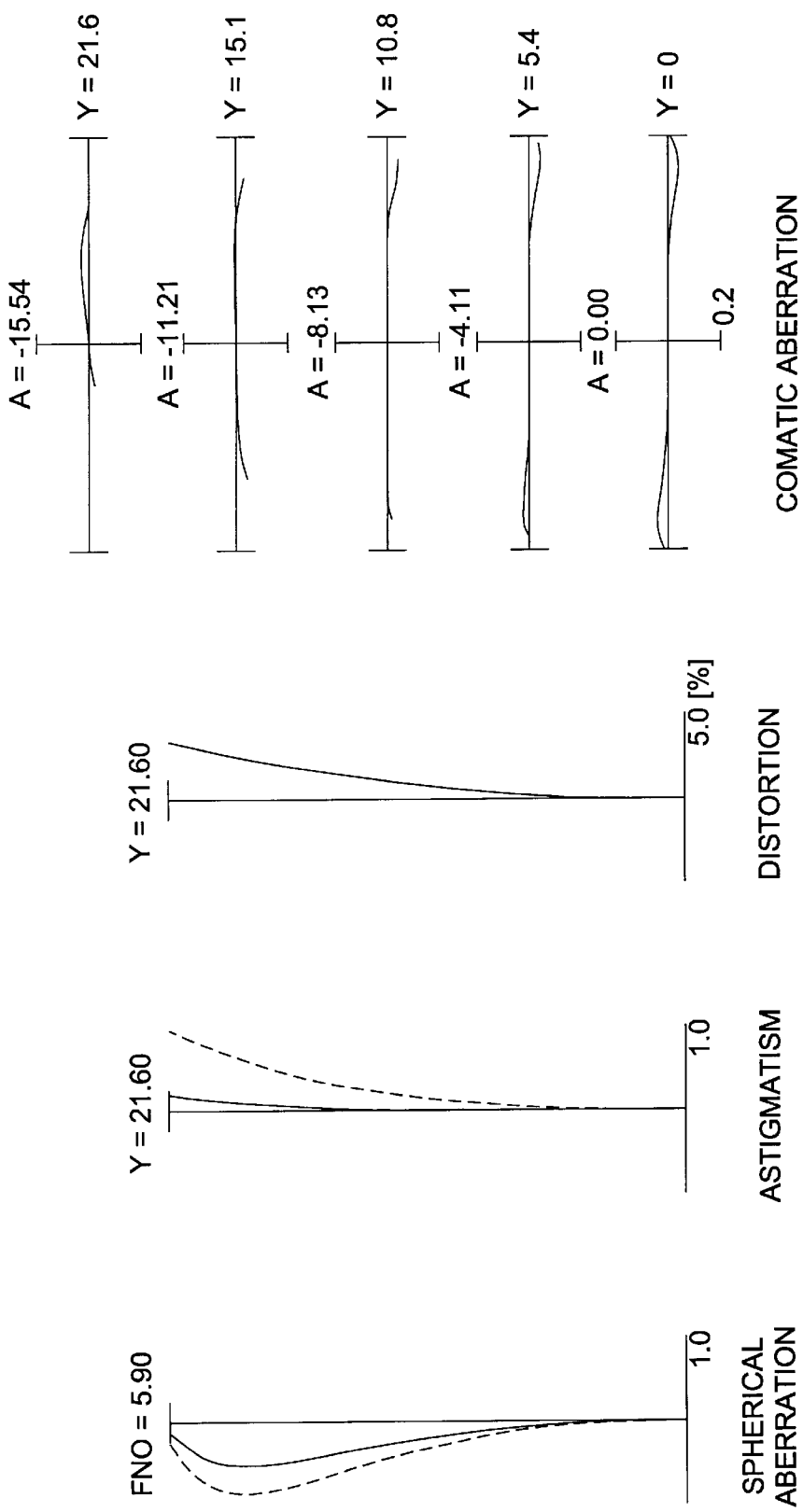
FIGS. 17(A)–(D) show graphs of aberrations in the intermediate focal length state of FIG. 15.
Figures 18A, 18B, 18C, 18D:
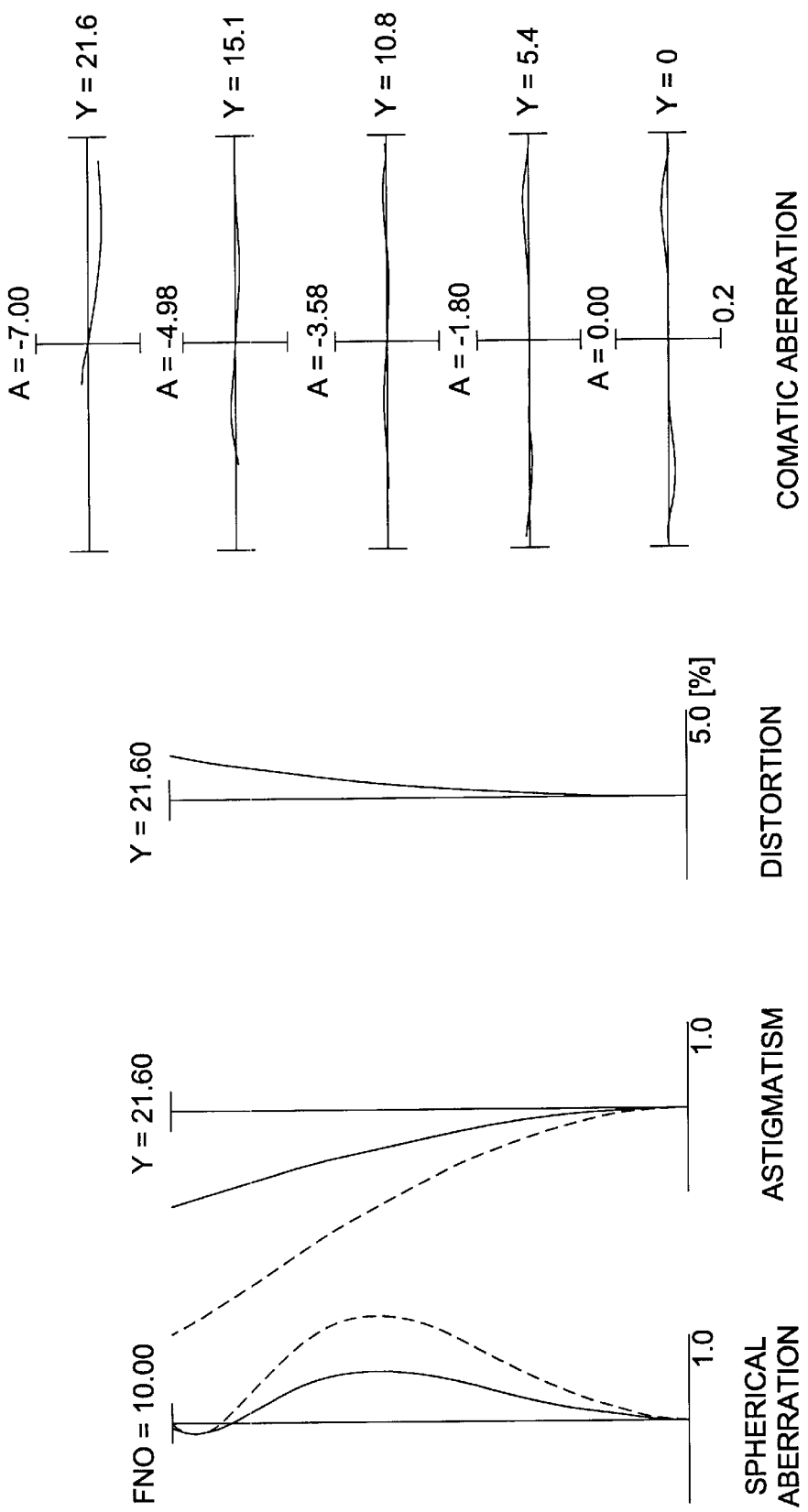
FIGS. 18(A)–(D) show graphs of aberrations in the maximum telephoto state of FIG. 15.

Various aberration figures according to the d line (l=587.6 nm) of the second preferred embodiment are shown in FIGS. 16–18. The various aberration figures of the infinite focus state in the maximum wide-angle state are shown in FIGS. 16(A)–(D), in the middle focus distance state in FIGS. 17(A)–(D) and in the maximum telephoto state in FIGS. 18(A)–(D). The aberration figures in second preferred embodiment show that various aberrations occurring in each of the focus distance states can be favorably corrected.

Figure 19:
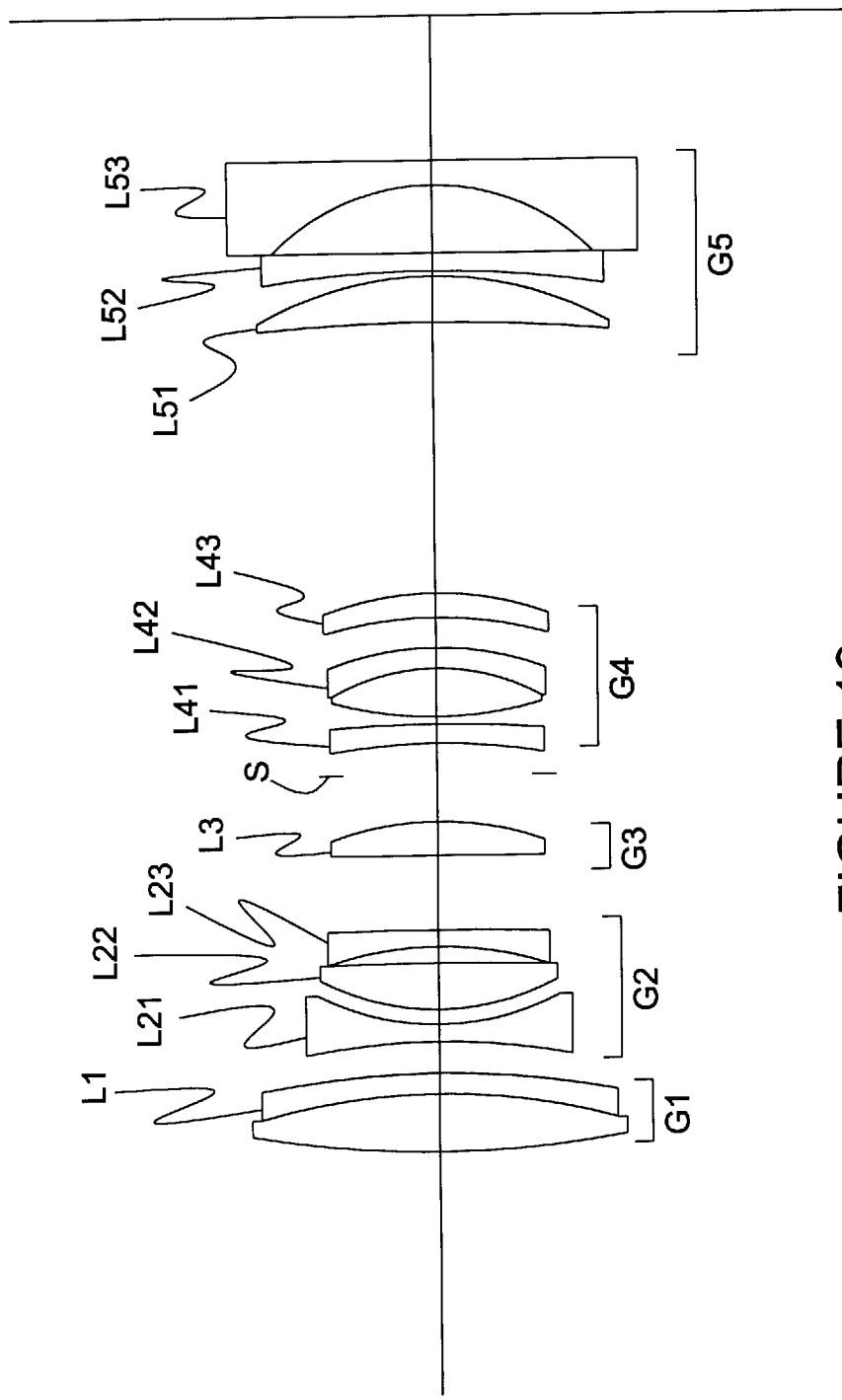
FIG. 19 shows a zoom lens system according to yet another embodiment of the present invention.

A zoom lens system according to a third preferred embodiment is shown in FIG. 19. The zoom lens system includes, in order from the object side, a first lens group G1 including a double convex lens and a cemented positive lens L1 having a negative meniscus lens with the concave surface facing the object side. A second lens group G2 includes a double concave lens L21, a double convex lens L22, and a negative meniscus lens L23 with the double concave surface facing the object side. A third lens group G3 includes a positive meniscus lens L3 with the concave surface facing the object side. A fourth lens group G4 includes a negative meniscus lens L41 with the concave surface facing the object side, a cemented positive lens L42 having a negative meniscus lens with the concave surface facing the object side and a double convex lens, and a positive meniscus lens L43 with the concave surface facing the object side. A fifth lens group G5 includes a positive meniscus lens L51 with the concave surface facing the object side, a negative meniscus lens L52 with the concave surface facing the object side and a double concave lens L53.

In addition, an aperture diaphragm S is located between the third lens group G3 and the fourth lens group G4. The aperture S moves integrally with the fourth lens group G4 when zooming the camera from the maximum wide-angle state W to the maximum telephoto state T.

The positional relationship of each lens group in the maximum wide-angle state W moves on an optical path along the zoom orbit (shown by arrows in FIG. 1) when zooming to the maximum telephoto state T.

Table (3) gives values of the various items of the third preferred embodiment.

TABLE 3 f = 39.01~75.75~166.65 mm
F No = 3.79~6.04~10.00
2w = 58.88~30.81~14.40°

| Surface Number | Radius of Curvature | Intersurface Distance | Abbe no. | Refractive Index |
|---|---|---|---|---|
| 1  | 69.1333   | 4.040          | 70.41     | 1.48749 |
| 2  | −39.8310  | 1.389          | 23.01     | 1.86074 |
| 3  | −61.6027  | (d3 = variable)| | |
| 4  | −45.5295  | 1.136          | 45.47     | 1.79668 |
| 5  | 18.1545   | 0.884          | | |
| 6  | 20.9504   | 3.156          | 25.80     | 1.78472 |
| 7  | −113.3730 | 1.010          | | |
| 8  | −21.4719  | 1.136          | 45.47     | 1.79668 |
| 9  | −315.9563 | (d9 = variable)| | |
| 10 | −544.2116 | 2.146          | 64.10     | 1.51680 |
| 11 | −20.4659  | (d11 = variable)| | |
| 12 | ∞         | 2.273          | (Aperture) | |
| 13*| −42.4553  | 1.263          | 30.24     | 1.58518 |
| 14 | −63.0506  | 0.379          | | |
| 15 | 30.7696   | 3.409          | 70.41     | 1.48749 |
| 16 | −13.7697  | 1.263          | 23.01     | 1.86074 |
| 17 | −22.0259  | 2.020          | | |
| 18 | −25.2500  | 1.641          | 57.57     | 1.49108 |
| 19 | −21.0319  | (d19 = variable)| | |
| 20 | −78.4639  | 3.156          | 25.50     | 1.80458 |
| 21 | −23.8209  | 0.253          | | |
| 22 | −58.1796  | 1.263          | 45.47     | 1.79668 |
| 23 | −233.1350 | 4.293          | | |
| 24 | −15.9354  | 1.515          | 49.45     | 1.77279 |
| 25 | 504.2188  | (Bf)           | | |

| k | $C_2$ | $C_4$ | $C_6$ | $C_8$ | $C_{10}$ |
|---|-------|-------|-------|-------|----------|
| 1.0000 | 0.0000 | −1.8615 × $10^{-5}$ | −1.2863 × $10^{-7}$ | 1.4575 × $10^{-9}$ | −2.2706 × $10^{-11}$ |

*non-spherical data

The variable spacing that occurs in zooming.

| f   | 39.0114 | 75.7508 | 166.6532 |
|-----|---------|---------|----------|
| d3  | 2.1462  | 12.2941 | 26.1956  |
| d9  | 5.1074  | 2.8677  | 1.2625   |
| d11 | 3.0988  | 5.3385  | 6.9437   |
| d19 | 18.1796 | 10.0287 | 1.8874   |
| Bf  | 9.8446  | 32.4166 | 77.1679  |

Corresponding values for in Conditions (1)–(5) are as follows:
(1) ra/rb=2.120;
(2) $(\beta 2w \cdot \beta 2t)^{1/2}$=0.519;
(3) $f1/(fw \cdot ft)^{1/2}$=1.146;
(4) $|f2|/(fw \cdot ft)^{1/2}$=0.304; and
(5) $(\beta 2t/\beta 2w)/(ft \cdot fw)$=0.401.

Figures 20A, 20B, 20C, 20D:
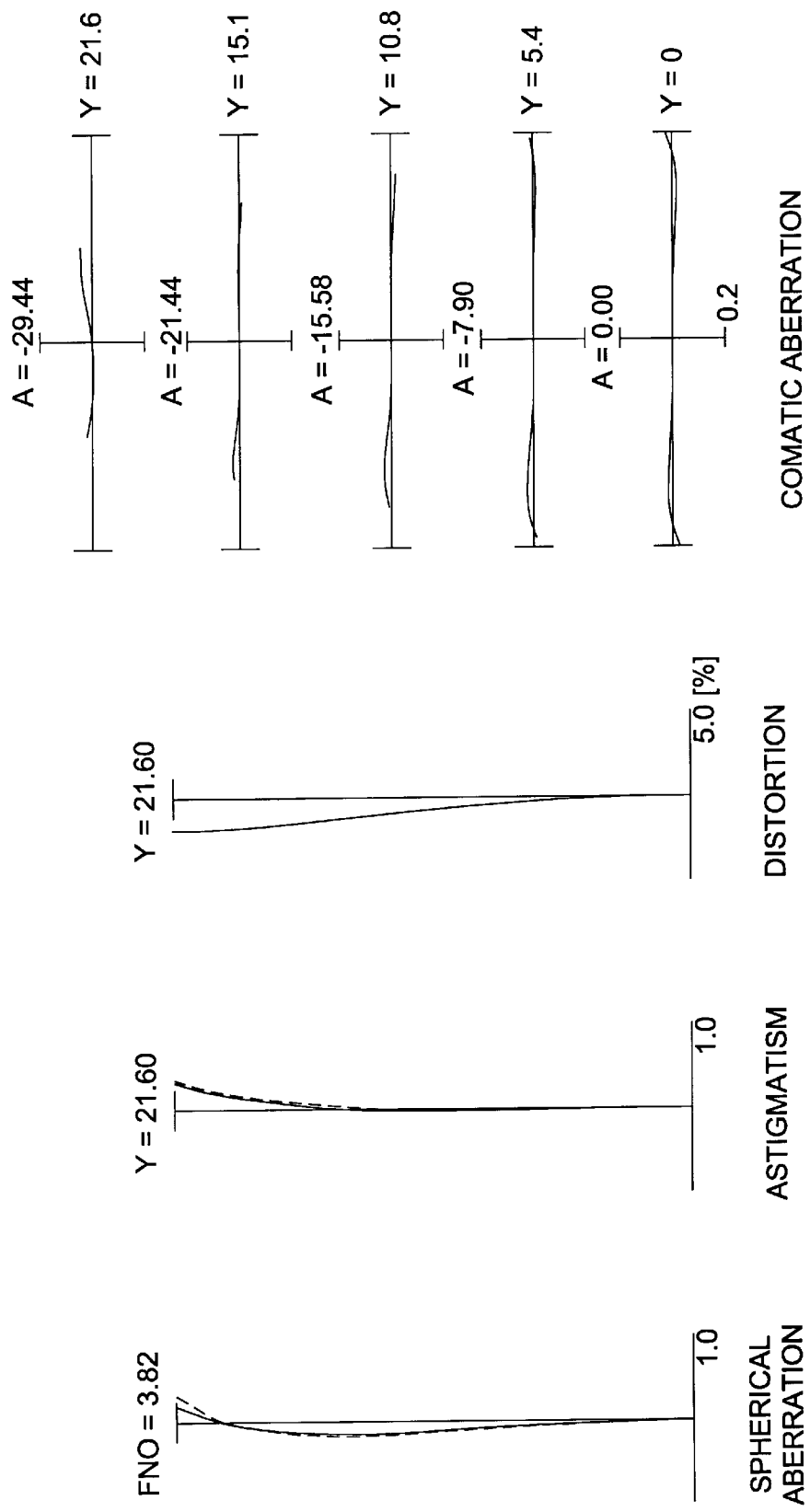
FIGS. 20(A)–(D) show graphs of aberrations in the maximum wide-angle state of FIG. 19.

FIGS. 20–22 depict various aberration figures corresponding to the d-line (l=587.6 nm) of the third preferred embodiment. The various aberration figures of the infinite focus state in the maximum wide-angle state are shown in FIGS. 20(A)–(D), in the middle focus distance state in FIGS. 21(A)–(D) and in the maximum telephoto state in FIGS. 22(A)–(D). Each of the aberration figures in third preferred embodiment demonstrate that various aberrations occurring in each focus distance state can be corrected.

Figure 23:
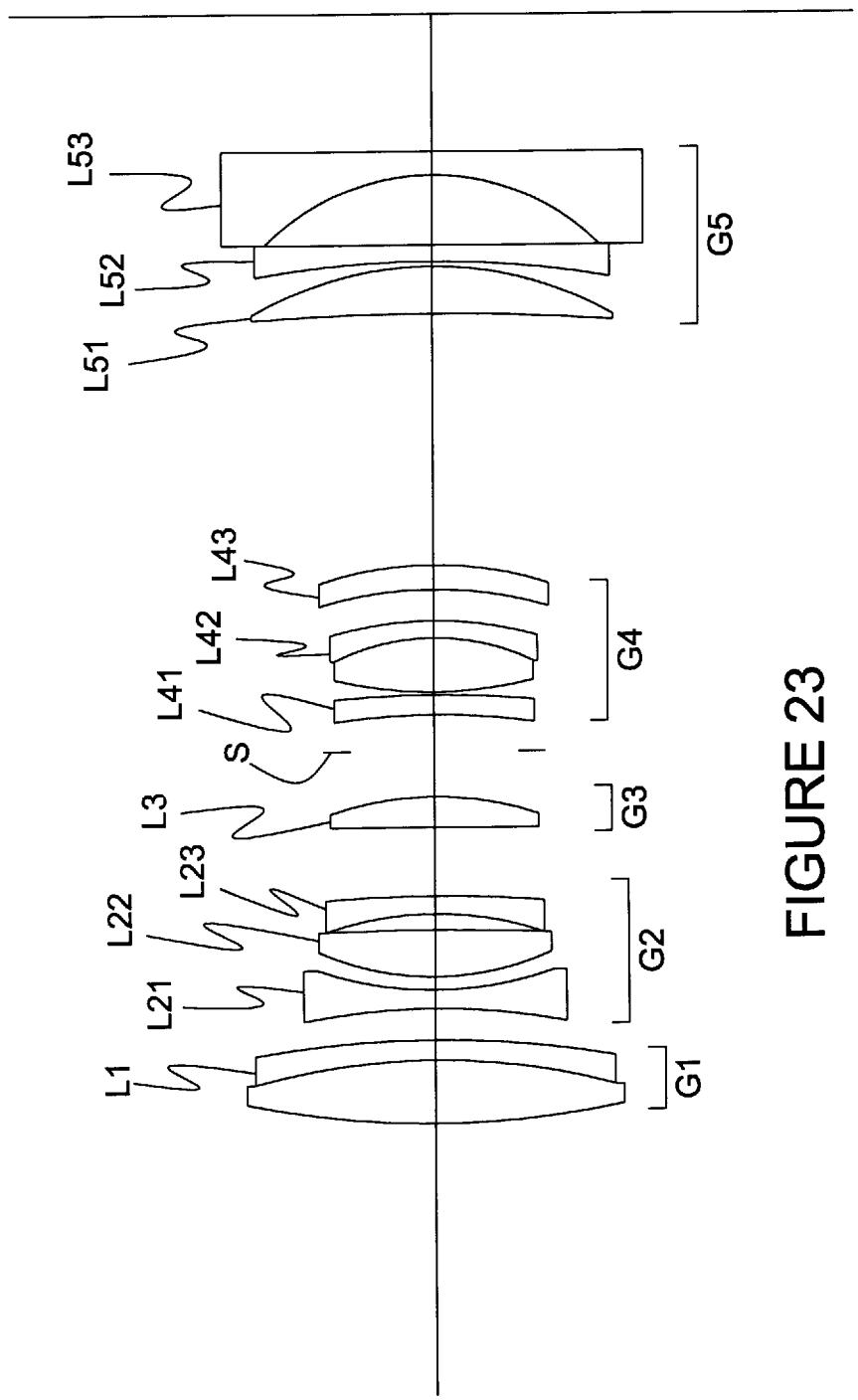
FIG. 23 shows a zoom lens system according to still yet another embodiment of the present invention.

A zoom lens system according to a fourth preferred embodiment is shown in FIG. 23. The zoom lens system includes, in order from the object side, a first lens group G1 including a double convex lens and a cemented positive lens L1 having a negative meniscus lens with the concave surface facing the object side. A second lens group G2 including a double concave lens L21, a double convex lens L22, and a negative meniscus lens L23 with the concave surface facing the object side. A third lens group G3 includes a double convex lens L3. A fourth lens group G4 includes a negative meniscus lens L41 with the concave surface facing the object side, a cemented positive lens L42 having a negative meniscus lens with the concave surface facing the object side and a double convex lens, and a positive meniscus lens L43 with the concave surface facing the object side. A fifth lens group G5 includes a positive meniscus lens L51 with the concave surface facing the object side, a negative meniscus lens L52 with the concave surface facing the object side and a negative meniscus lens L53 with the concave surface facing the object side.

An aperture diaphragm S is located between the third lens group G3 and the fourth lens group G4 and moves integrally with the fourth lens group G4 when zooming from the maximum wide-angle state W to the maximum telephoto state T.

Each lens group in the maximum wide-angle state W moves on an optical path along the zoom orbit (shown by arrows in FIG. 1) when zooming to the maximum telephoto state T.

Table (4) gives values of the various items of the fourth preferred embodiment.

TABLE 4 f = 39.00~75.41~154.04 mm
F No = 3.91~6.23~10.00
2ω = 58.44~30.89~15.57°

| Surface Number | Radius of Curvature | Intersurface Distance | Abbe no. | Refractive Index |
|---|---|---|---|---|
| 1 | 73.7629 | 4.040 | 70.41 | 1.48749 |
| 2 | −41.5931 | 1.389 | 23.01 | 1.86074 |
| 3 | −63.8442 | (d3 = variable) | | |
| 4 | −41.0431 | 1.136 | 45.47 | 1.79668 |
| 5 | 22.0039 | 0.884 | | |
| 6 | 18.9015 | 3.156 | 25.80 | 1.78472 |
| 7 | −125.9017 | 1.010 | | |
| 8 | −21.0658 | 1.136 | 45.47 | 1.79668 |
| 9 | −222.8375 | (d9 = variable) | | |
| 10 | 440.1793 | 2.146 | 64.10 | 1.51680 |
| 11 | −20.2109 | (d11 = variable) | | |
| 12 | ∞ | 2.273 | (Aperture) | |
| 13* | −44.7139 | 1.263 | 30.24 | 1.58518 |
| 14 | −63.0506 | 0.379 | | |
| 15 | 28.1801 | 3.409 | 70.41 | 1.48749 |
| 16 | −15.0147 | 1.263 | 23.01 | 1.86074 |
| 17 | −24.9142 | 2.020 | | |
| 18 | −24.4953 | 1.641 | 57.57 | 1.49108 |
| 19 | −20.9632 | (d19 = variable) | | |
| 20 | −63.2488 | 3.156 | 25.50 | 1.80458 |
| 21 | −22.5391 | 0.253 | | |
| 22 | −53.6956 | 1.263 | 45.47 | 1.79668 |
| 23 | −215.4205 | 4.293 | | |
| 24 | −15.1489 | 1.515 | 49.45 | 1.77279 |
| 25 | −832.3912 | (Bf) | | |

| k | $C_2$ | $C_4$ | $C_6$ | $C_8$ | $C_{10}$ |
|---|---|---|---|---|---|
| 1.0000 | 0.0000 | $-2.1071 \times 10^{-5}$ | $-4.0225 \times 10^{-8}$ | $-1.6187 \times 10^{-9}$ | $9.7541 \times 10^{-12}$ |

*non-spherical data

The variable spacing that occurs in zooming.

| f | 39.0006 | 75.4128 | 154.0379 |
|---|---|---|---|
| d3 | 2.1462 | 12.6178 | 25.1286 |
| d9 | 4.4295 | 2.4454 | 1.2625 |
| d11 | 3.1455 | 5.1296 | 6.3125 |

-continued

| d19 | 16.8906 | 8.9876 | 1.8874 |
|---|---|---|---|
| Bf | 9.1076 | 30.8846 | 70.5056 |

Corresponding values for Conditions (1)–(5) are as follows:
(1) ra/rb=1.948;
(2) $(\beta 2w \cdot \beta 2t)^{1/2}$=0.486;
(3) $f1/(fw \cdot ft)^{1/2}$=1.167;
(4) $|f2|/(fw \cdot ft)^{1/2}$=0.414; and
(5) $(\beta 2t/\beta 2w)/(ft/fw)$=0.405.

Figures 24A, 24B, 24C, 24D:
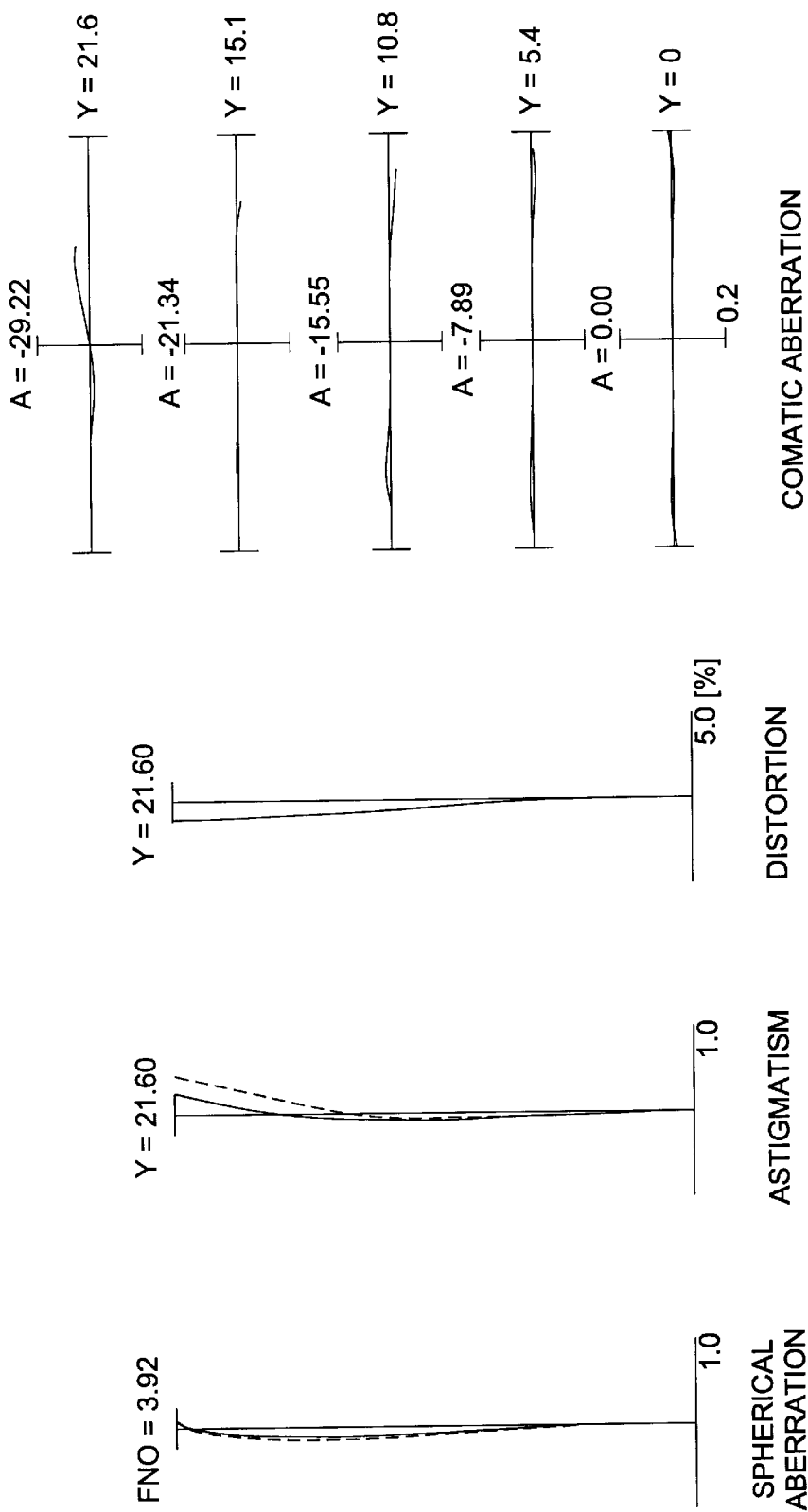
FIGS. 24(A)–(D) show graphs of aberrations in the maximum wide-angle state of FIG. 23.
Figures 25A, 25B, 25C, 25D:
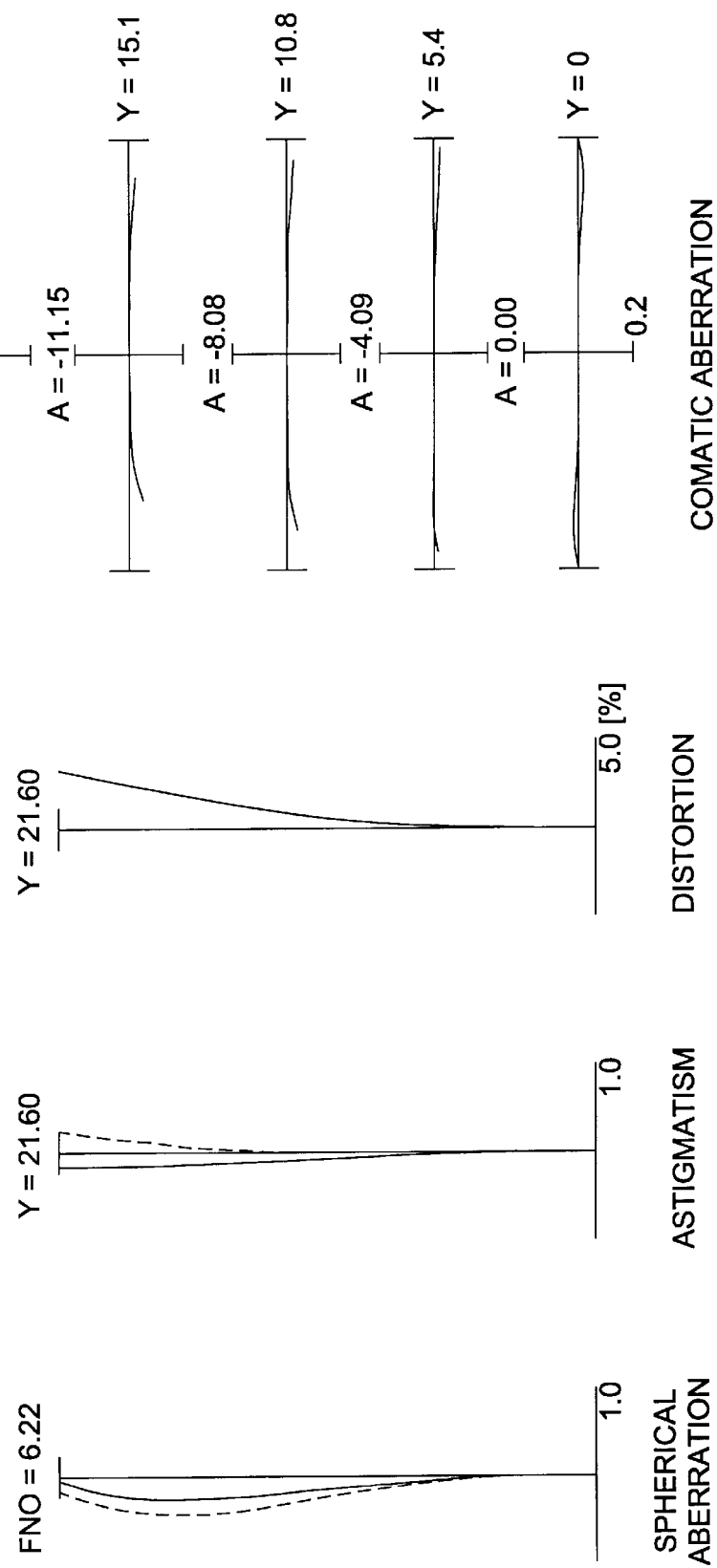
FIGS. 25(A)–(D) show graphs of aberrations in the intermediate focal length state of FIG. 23.
Figures 26A, 26B, 26C, 26D:
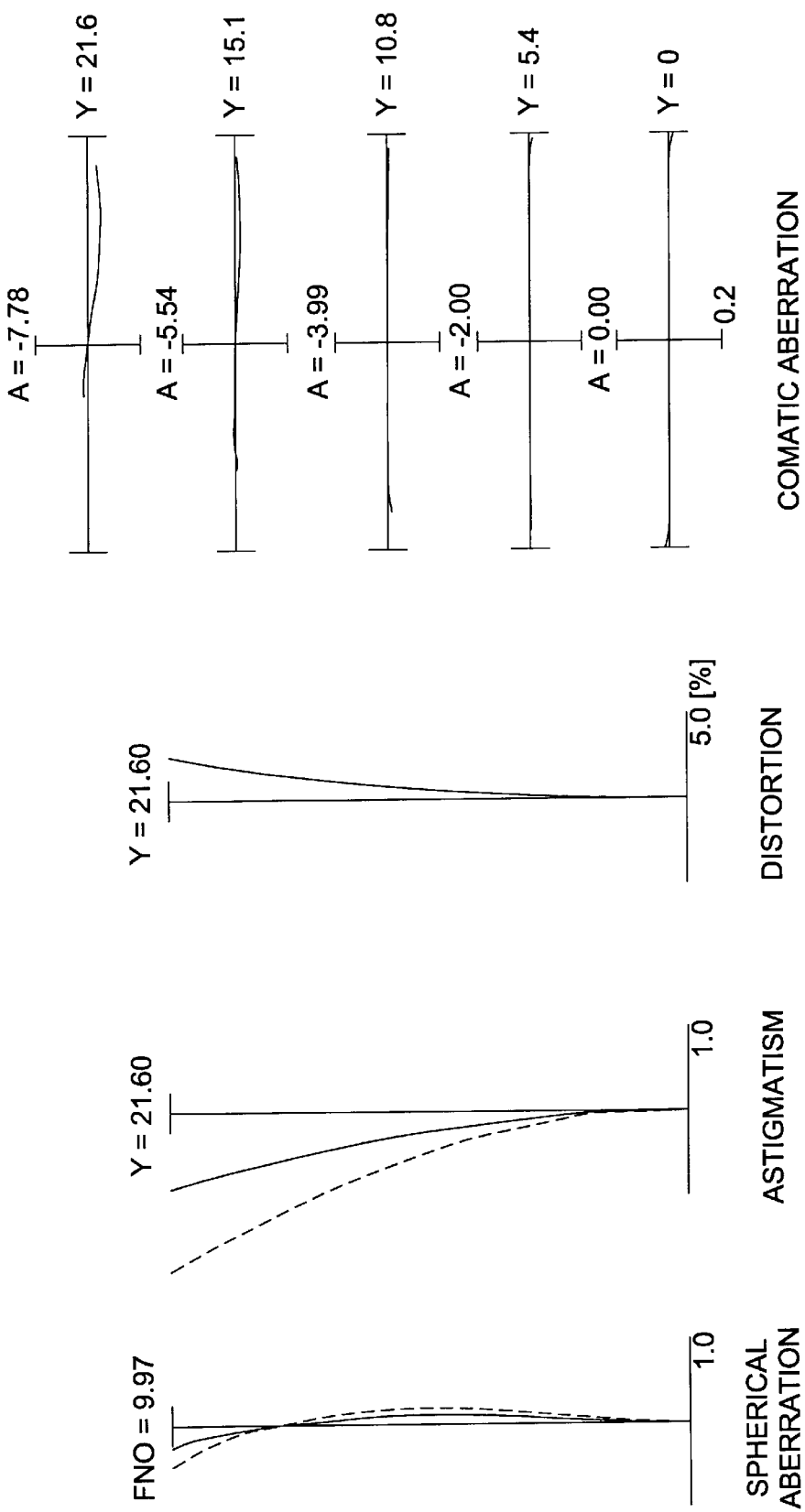
FIGS. 26(A)–(D) show graphs of aberrations in the maximum telephoto state of FIG. 23.

FIGS. 24–26 depict various aberration figures corresponding to the d-line (l=587.6 nm) of the fourth preferred embodiment. The various aberration figures of the infinite focus state that occur in the maximum wide-angle state are shown in FIGS. 24(A)–(D), in the middle focus distance state in FIGS. 25(A)–(D), in the maximum telephoto state in FIGS. 26(A)–(D). Each of the aberration figures in the fourth preferred embodiment demonstrate that various aberrations occurring in each focus distance state can be corrected.

Further, in the zoom lens systems according to the second, third and fourth embodiments, good image formation performance is possible even with an image shifting zoom lens system as shown in the first embodiment and not just with the normal type of zoom lens system. In addition, exemplary image formation performance for image shifting of only 0.01 radian (with respect to the optical axis) has been shown in the first embodiment. However, favorable image formation performance can be obtained against even an additionally larger image shifting amount.

Additionally, in the first embodiment, focusing of the near-distance object is performed by moving the third lens group G3 along the optical axis. That focusing method is also acceptable even in the second, third and fourth embodiments. It is also possible to perform focusing by moving a part or whole of a lens group along the optical path other than the third lens group G3.

As explained and demonstrated above, a high variable power zoom lens system is provided having a favorable image formation performance and that also covers a wide-angle area.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A zoom lens system comprising:
    a first lens group of positive refractive power positioned nearest an object side of the zoom lens system;
    a second lens group of negative refractive power adjacent the first lens group on an image side, the second lens group consists of only three lens elements, the second lens group consisting of, in order from the object side:
        a first lens subgroup,
        a second double convex lens subgroup on the image side of, and separated by an airspace from, the first lens subgroup, and
        a third lens subgroup on the image side of, and separated by an airspace from, the second lens subgroup; and
    a third lens group of positive refractive power adjacent the second lens group on the image side, wherein each lens group moves during zooming from a maximum wide-angle state to a maximum telephoto state so that a spacing between the first lens group and the second lens group changes and a radius of curvature ra of a surface on the object side of the first lens subgroup and a radius of curvature rb of a surface on the object side of the third lens subgroup satisfy:

$$0.8 < ra/rb < 3.$$

2. The zoom lens system of claim 1, wherein a lateral magnification β2w of the second lens group at the maximum wide-angle state and a lateral magnification β2t of the second lens group at the maximum telephoto state satisfy:

$$0.4 < (\beta 2w \cdot \beta 2t)^{1/2} < 0.7.$$

3. The zoom lens system of claim 1, wherein a focal length f1 of the first lens group, a focal length fw of the zoom lens system in the maximum wide-angle state and a focal length ft of the zoom lens system in the maximum telephoto state satisfy:

$$0.8 < f1/(fw \cdot ft)^{1/2} < 1.4.$$

4. The zoom lens system of claim 1, wherein a focal length f2 of the second lens group, a focal length fw of the zoom lens system in the maximum wide-angle state and a focal length ft of the total zoom system in the maximum telephoto state satisfy:

$$0.2 < |f2|/(fw \cdot ft)^{1/2} < 0.4.$$

5. The zoom lens system of claim 1, wherein a lateral magnification β2w of the second lens group at the maximum wide-angle state, a lateral magnification β2t of the second lens group at the maximum telephoto state, a focal length ft of the zoom lens system in the maximum telephoto state and a focal length fw of the zoom lens system in the maximum wide-angle state satisfy:

$$0.28 < (\beta 2t/\beta 2w)/(ft/fw) < 0.52.$$

6. The zoom lens system of claim 1, further comprising a fourth lens group on the image side of the third lens group and a fifth lens group on the image side of the fourth lens group, a spacing between the fourth lens group and the fifth lens group changing when focusing from the maximum wide-angle state to the maximum telephoto state.

7. The zoom lens system of claim 6, wherein the fourth lens group has a positive refractive power.

8. The zoom lens system of claim 6, further comprising an aperture diaphragm located between the third lens group and the fourth lens group.

9. The zoom lens system of claim 1, further comprising a shiftable lens group comprising lens elements movable in a direction orthogonal to an optical axis of the zoom lens system and a moving device that moves the lens elements of the shiftable lens group in the orthogonal direction.

10. The zoom lens system of claim 9, wherein the moving device comprises:
a sensor device to sense a fluctuation of the zoom lens system;
an actuator that contacts the shiftable lens group; and
a controller to control the actuator based on the fluctuation sensed by the sensor device.

11. The zoom lens system of claim 1, wherein the third lens subgroup consists of a lens having a concave surface facing the object side and the first lens subgroup consists of a double concave lens.

12. A zoom lens system having a plurality of optical elements positioned along an optical axis from an object side to an image side, the system comprising:
a first lens group of positive refractive power;
a second lens group of negative refractive power on the image side of the first lens group;
a third lens group of positive refractive power on the image side of the second lens group; and
a fourth lens group of positive refractive power on the image side of the third lens group, the fourth lens group comprising lens elements movable in a direction orthogonal to the optical axis, wherein each lens group moves during zooming from a maximum wide-angle state to a maximum telephoto state so that spacing between each of the lens groups changes, the second lens group consists of in order from the object side, a double concave lens element, a double convex lens element, and a negative lens element having a concave surface facing the object side.

13. The zoom lens system of claim 12, wherein a radius of curvature ra of a surface on the object side of the double concave lens and a radius of curvature rb of the concave surface of the negative lens element satisfy $$0.8 < ra/rb < 3.$$

14. The zoom lens system of claim 12, wherein a lateral magnification β2w of the second lens group at the maximum wide-angle state and a lateral magnification β2t of the second lens group at the maximum telephoto state satisfy:

$$0.4 < (\beta 2w \cdot \beta 2t)^{1/2} < 0.7.$$

15. The zoom lens system of claim 12, wherein a focal length f1 of the first lens group, a focal length fw of the zoom lens system in the maximum wide-angle state and a focal length ft of the zoom lens system in the maximum telephoto state satisfy:

$$0.8 < f1/(fw \cdot ft)^{1/2} < 1.4.$$

16. The zoom lens system of claim 12, wherein a focal length f2 of the second lens group, a focal length fw of the zoom lens system in the maximum wide-angle state and a focal length ft of the zoom lens system in the maximum telephoto state satisfy:

$$0.2 < |f2|/(fw \cdot ft)^{1/2} < 0.4.$$

17. The zoom lens system of claim 12, wherein a lateral magnification β2w of the second lens group at the maximum wide-angle state, a lateral magnification β2t of the second lens group at the maximum telephoto state, a focal length ft of the zoom lens system in the maximum telephoto state and a focal length fw of the zoom lens system in the maximum wide-angle state satisfy:

$$0.28 < (\beta 2t/\beta 2w)/(ft/fw) < 0.52.$$

18. The zoom lens system of claim 12, further comprising moving means for moving the lens elements of the fourth lens group in the direction orthogonal to the optical axis.

19. The zoom lens system of claim 18, wherein the moving means comprises:
sensor means for sensing a fluctuation of the zoom lens system;
an actuator that contacts the fourth lens group; and
a controller to control the actuator based on the fluctuation sensed by the sensor means.

* * * * *